US010404966B2

(12) United States Patent
Oh et al.

(10) Patent No.: US 10,404,966 B2
(45) Date of Patent: Sep. 3, 2019

(54) OPTICAL MODULATION DEVICE AND DRIVING METHOD THEREOF

(71) Applicant: SAMSUNG DISPLAY CO., LTD., Yongin-si, Gyeonggi-Do (KR)

(72) Inventors: Soo Hee Oh, Hwaseong-si (KR); Seung Jun Jeong, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 673 days.

(21) Appl. No.: 14/995,969

(22) Filed: Jan. 14, 2016

(65) Prior Publication Data

US 2016/0274395 A1    Sep. 22, 2016

(30) Foreign Application Priority Data

Mar. 17, 2015 (KR) .................. 10-2015-0036791

(51) Int. Cl.
*H04N 13/236* (2018.01)

(52) U.S. Cl.
CPC ..... *H04N 13/236* (2018.05); *H04N 2213/001* (2013.01)

(58) Field of Classification Search
CPC .......... G02F 1/13306; G02F 1/1337; H04N 13/236; H04N 2213/001
USPC .......................................... 349/13
See application file for complete search history.

(56) References Cited

U.S. PATENT DOCUMENTS

| 8,531,646 B2 | 9/2013 | Shi et al. |
| 2009/0073331 A1* | 3/2009 | Shi .................. G02F 1/292 349/18 |

FOREIGN PATENT DOCUMENTS

| JP | 2014-016419 | 1/2014 |
| KR | 1020110077709 | 7/2011 |

OTHER PUBLICATIONS

Lei Shi, et al., "Liquid Crystal Optical Phase Plate With a Variable In-Plane Gradient," Journal of Applied Physics 104, 033109 (2008) pp. 1-7.
Paul F. McManamon, et al., "A Review of Phased Array Steering for Narrow-Band Elecrooptical Systems," Proceedings of the IEEE, vol. 97, No. 6, Jun. 2009, pp. 1078-1096.

* cited by examiner

*Primary Examiner* — Charles S Chang
(74) *Attorney, Agent, or Firm* — F. Chau & Associates, LLC

(57) ABSTRACT

A method of driving an optical modulation device includes applying a voltage to an upper electrode; forming a forward phase slope by applying a first driving signal to a lower electrode in a first area; forming a backward phase slope by applying a second driving signal different from the first driving signal to another lower electrode in a second area; forming an area without phase retardation by applying a third driving signal to two lower electrodes in a third area between the first area and the second area; and forming a flat phase slope by applying a fourth driving signal different from the first to third driving signals one lower electrode in a fourth area between the first area and the second area.

20 Claims, 30 Drawing Sheets

OPTICAL MODULATION DEVICE AND DRIVING METHOD THEREOF

CROSS-REFERENCE TO RELATED APPLICATION

This application claims priority under 35 U.S.C. § 119 from, and the benefit of, Korean Patent Application No. 10-2015-0036791 filed in the Korean Intellectual Property Office on Mar. 17, 2015, the contents of which are herein incorporated by reference in their entirety.

BACKGROUND (a) Technical Field

Embodiments of the present disclosure are directed to an optical modulation device and a driving method thereof, and more particularly, embodiments of the present disclosure are directed to an optical modulation device that includes liquid crystals, a driving method thereof, and an optical device using the same.

(b) Discussion of Related Art

Recently, optical display devices that use an optical modulation device that modulates characteristics of light have been actively developed. For example, optical display devices that can display a 3-dimensional (3D) image can divide an image with different viewpoints to be transmitted so that a viewer can perceive the image as a stereoscopic image. Optical modulation devices that can be used in an autostereoscopic 3D image display device include a lens, a prism, etc., for altering a path of light to transmit the image of the display device to a desired viewpoint.

As such, a direction of incident light can be altered by light diffraction through a phase modulation thereof.

When polarized light passes through an optical modulation device such as a phase retarder, its polarization state is changed. For example, when circularly polarized light is incident on a half-wave plate, the circularly polarized light is emitted with its rotation direction reversed. For example, when right-circularly polarized light passes through the half-wave plate, left-circularly polarized light is emitted. In this case, a phase of the circularly polarized light shifts according to an optical axis of the half-wave plate, that is, a slow axis.

Specifically, when the optical axis of a half-wave plate rotates in-plane by $\varphi$, a phase of the outputted light shifts by $2\varphi$. Thus, when the optical axis of a half-wave plate is spatially rotated in an x-axis direction by 180° ($\pi$ radians), the emitted light may have a phase modulation or shift of 360° ($2\pi$ radians) in the x-axis direction. As such, when an optical modulation device induces a phase shift from 0 to $2\pi$ as a function of a position, a diffraction grating or prism that can alter or diffract the transmitted light can be implemented.

Liquid crystals may be used to adjust the optical axis of an optical modulation device, such as a half-wave plate, as a function of position thereof. In an optical modulation device implemented as a phase retarder that uses liquid crystals, long axes of the liquid crystal molecules, which are aligned by applying an electric field to a liquid crystal layer, may rotate to change the phase modulation as a function of position. The phase of the light emitted after passing through an optical modulation device may be determined by the directions of the longer axes of the aligned liquid crystal molecules, that is, the azimuthal angle.

To implement a prism, diffraction grating, lens, etc., using an optical modulation device that uses the liquid crystals to continuously modulate phase, the liquid crystal molecules should be aligned so that directions of their long axes can continuously change as a function of position. For emitted light to have a phase profile that changes from 0 to $2\pi$ as a function of position, a half-wave plate should have an optical axis that changes from 0 to $\pi$. For this purpose, liquid crystals need to be aligned in different directions as a function of position with respect to a substrate adjacent to the liquid crystal layer.

SUMMARY

Embodiments of the present disclosure can provide an optical modulation device containing liquid crystals that can modulate an optical phase by controlling an in-plane rotation angle of liquid crystal molecules, and can form various diffraction angles of light by controlling a rotation direction of the liquid crystal molecules.

In addition, embodiments of the present disclosure can provide an optical modulation device containing liquid crystals that can simplify a manufacturing process thereof.

Further, embodiments of the present disclosure can provide an optical modulation device in which a left forward phase slope and a right backward phase slope are smoothly connected at a center of a lens.

Further, embodiments of the present disclosure can provide an optical modulation device that can implement a boundary between two adjacent lenses.

An optical modulation device including liquid crystals according to embodiments of the disclosure is adapted to large displays, and can function as a lens to be used in various optical devices, such as a stereoscopic image display device.

An exemplary embodiment of the present disclosure provides a method of driving an optical modulation device that includes a first plate that includes a plurality of lower electrodes, a second plate facing the first plate and that includes at least one upper electrode, and a liquid crystal layer disposed between the first plate and the second plate and that includes a plurality of liquid crystal molecules, the method comprising: applying a voltage to the upper electrode; forming a forward phase slope by applying a first driving signal to at least one lower electrode in a first area; forming a backward phase slope by applying a second driving signal different from the first driving signal to at least one lower electrode in a second area; forming an area without phase retardation by applying a third driving signal to at least two lower electrodes in a third area between the first area and the second area that is narrower than the first area and the second area; and forming a flat phase slope by applying a fourth driving signal different from the first to third driving signals to at least one lower electrode in a fourth area between the first area and the second area.

When the first driving signal is applied to at least one lower electrode in the first area, an absolute value of a first voltage applied to the lower electrode in a first unit area in the first area may be less than that of a second voltage applied to the lower electrode in a second unit area adjacent to the first unit area.

When the first driving signal is applied to the lower and upper electrodes in the first area, polarities of the first voltage and the second voltage with respect to the voltage of the upper electrode of may be the same.

Forming the backward phase slope in the second area may include applying a fifth driving signal different from the first and second driving signals to at least one lower electrode in the second area and applying the second driving signal thereto when a first time interval elapses; and applying the second driving signal to at least one lower electrode in the second area and applying the first driving signal thereto when a second time interval elapses.

When the second driving signal is applied to at least one lower electrode in the second area, a polarity of a third voltage applied to the lower electrode in a third unit area in the second area may be opposite to a polarity of a fourth voltage applied to the lower electrode in a fourth unit area adjacent to the third unit area.

When the first driving signal is applied to at least one lower electrode in the second area, an absolute value of a fifth voltage applied to the lower electrode in the third unit area may be greater than that of a sixth voltage applied to the lower electrode in the fourth unit area.

Forming an area without phase retardation in the third area may include applying the fifth driving signal to at least one lower electrode in the third area and applying the third driving signal thereto when the first time interval elapses, and applying the third driving signal to at least one lower electrode in the third area and applying the first driving signal thereto when the second time interval elapses.

When the fifth driving signal is applied to at least one lower electrode in the third area, an absolute value of a seventh voltage applied to the lower electrode in a fifth unit area in the third area may be less than that of a eighth voltage applied to the lower electrode in a sixth unit area adjacent to the fifth unit area, and polarities of the fourth voltage and the eighth voltage with respect to the voltage of the upper electrode may be the same.

When the third driving signal is applied to at least one lower electrode in the third area, a polarity of a ninth voltage applied to the lower electrode in the fifth unit area may be opposite to a polarity of the seventh and eighth voltages, and a voltage applied to the lower electrode in the sixth unit area may be the same as that of the upper electrode.

Forming the flat phase slope in the fourth area may include applying the fifth driving signal to at least one lower electrode in the fourth area and applying a sixth driving signal different from the first to fifth driving signals thereto when the first time interval elapses; and applying the sixth driving signal to at least one lower electrode in the third area and applying the fourth driving signal thereto when the second time interval elapses.

When the sixth driving signal is applied to at least one lower electrode in the fourth area, a voltage applied to at least one lower electrode in the fourth area may be the same as that of the upper electrode.

When the fourth driving signal is applied to at least one lower electrode in the fourth area, an absolute value of a voltage applied to at least one lower electrode in the fourth area may be less than that of the first voltage and greater than that of the second.

Another exemplary embodiment of the present disclosure provides an optical modulation device that includes a first plate that including a plurality of lower electrodes; a second plate facing the first plate and that includes at least one upper electrode; and a liquid crystal layer disposed between the first plate and the second plate and that includes a plurality of liquid crystal molecules. The optical modulation device may be driven by a method that includes applying a voltage to the upper electrode; forming a forward phase slope by applying a first driving signal to at least one lower electrode in a first area; forming a backward phase slope by applying a second driving signal different from the first driving signal to at least one lower electrode in a second area; forming an area without phase retardation by applying a third driving signal to at least two lower electrodes in a third area between the first area and the second area that is narrower than the first area and the second area; and forming a flat phase slope by applying a fourth driving signal different from the first to third driving signals to at least one lower electrode in a fourth area between the first area and the second area.

An absolute value of a first voltage applied to the lower electrode in a first unit area in the first area may be less than that of a second voltage applied to the lower electrode in a second unit area adjacent to the first unit area.

A fifth driving signal different from the first and second driving signals may be applied to at least one lower electrode in the second area, and the second driving signal may be applied thereto when a first time interval elapses; and the second driving signal may be applied to at least one lower electrode in the second area, and the first driving signal may be applied thereto when a second time interval elapses.

The fifth driving signal may be applied to at least one lower electrode in the third area, and the third driving signal may be applied thereto when the first time interval elapses; and the third driving signal may be applied to at least one lower electrode in the third area, and the first driving signal may be applied thereto when the second time interval elapses.

The fifth driving signal may be applied to at least one lower electrode the fourth area, and a sixth driving signal different from the first to fifth driving signals may be applied thereto when the first time interval elapses; and the sixth driving signal may be applied to at least one lower electrode in the third area, and the fourth driving signal may be applied thereto when the second time interval elapses.

The first plate may include a first aligner, the second plate may include a second aligner, and an alignment direction of the first aligner and an alignment direction of the second aligner may be substantially parallel to each other.

Another exemplary embodiment of the present disclosure provides a method of driving an optical modulation device, wherein the optical modulation device includes an upper electrode, a plurality of lower electrodes facing the upper electrode that are numbered sequentially from left to right and that include a first and second electrodes in a left region, third and fourth electrodes in a center region, and fifth and sixth electrodes in a right region, and a liquid crystal layer between the upper electrode and the plurality of lower electrodes. The method includes applying a common voltage to the upper electrode; applying, during a first time interval, a first voltage and a second voltage less than the first voltage and greater than the common voltage respectively to the second and first electrodes, to the fourth and third electrodes, and to the fifth and sixth electrodes; applying, during a second time interval, the common voltage to the first to fourth electrodes, and the first voltage and a third voltage less than the common voltage respectively to the fifth and sixth electrodes; applying, during a third time interval, the first and second voltages respectively to the first and second electrodes and to the sixth and fifth electrodes, and a center voltage intermediate in value between the first and second voltages to the third and fourth electrodes; and applying, during a fourth time interval, fourth voltage and a sixth voltage respectively to the first and second electrodes and to the sixth and fifth electrodes, and a fifth voltage to the third and fourth electrodes, wherein the sixth voltage is greater than the fifth voltage which is greater than the fourth voltage, and the fourth voltage, the fifth voltage, and the sixth voltage are each respectively greater than the first voltage, the center voltage, and the second voltage by a predetermined amount.

The first to sixth electrodes may be periodically repeated, a lens may be formed by application of voltages in the liquid crystal layer between the upper electrode and the repeated first to sixth electrodes, and the lens may include a forward phase slope in a region corresponding to the first and second electrodes, a flat phase slope in a region corresponding to the third and fourth electrodes, and a backward phase slope in a region corresponding to the fifth and sixth electrodes, and a boundary without phase retardation between the sixth electrode of a left side lens and the first electrode of a right side lens.

Exemplary embodiments of the present disclosure can provide an optical modulation device that can modulate an optical phase by controlling an in-plane rotation angle of liquid crystal molecules, and can form various diffraction angles of light by controlling a rotation direction of the liquid crystal molecules.

Exemplary embodiments of the present disclosure can simplify a manufacturing process of the optical modulation device containing the liquid crystals, reduce a manufacturing time, and remove defects due to a pretilt distribution of the liquid crystal molecules.

Exemplary embodiments of the present disclosure can suppress a texture by reinforcing a control force for the liquid crystal molecules thereby enhancing diffraction efficiency.

Exemplary embodiments of the present disclosure can provide an optical modulation device adapted to large displays, and can function as a lens, a diffraction lattice, a prism, etc., to be used in various optical devices such as a stereoscopic image display device.

According to exemplary embodiments of the present disclosure, since a phase of a center portion of the optical modulation device is smooth, a left forward phase slope and a right backward phase slope of the optical modulation device are smoothly connected at a center of a lens.

Further, according to exemplary embodiments of the present disclosure, a boundary between two adjacent lenses of the optical modulation device may be implemented.

DETAILED DESCRIPTION

Figure 1:
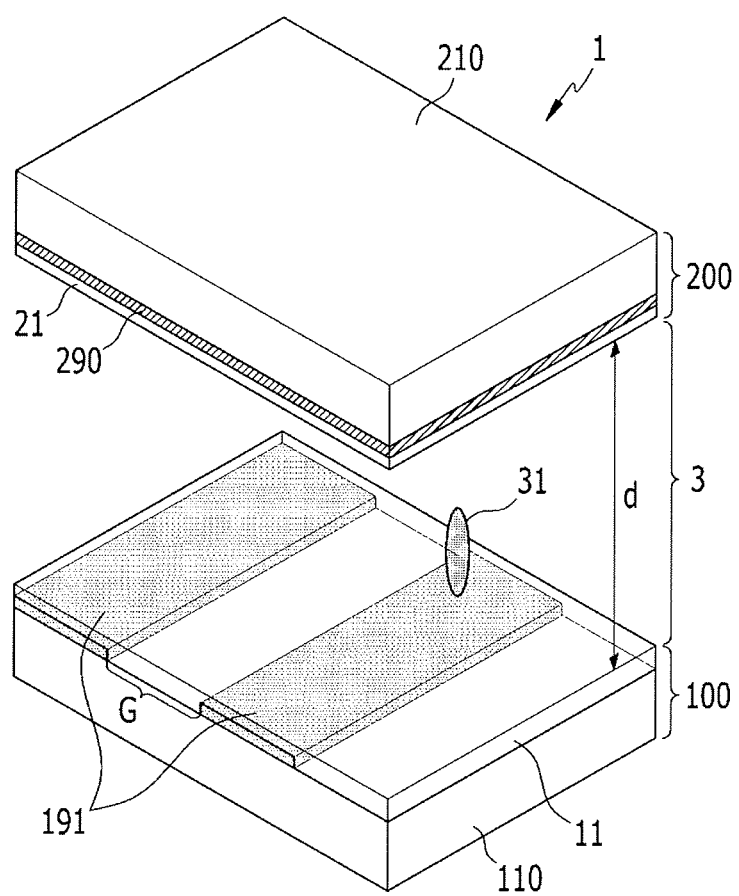
FIG. 1 is a perspective view of an optical modulation device according to an exemplary embodiment of the present disclosure.

Embodiments of the present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

An optical modulation device according to an exemplary embodiment of the present disclosure will be described with reference to FIGS. 1 to 3.

Figure 2:
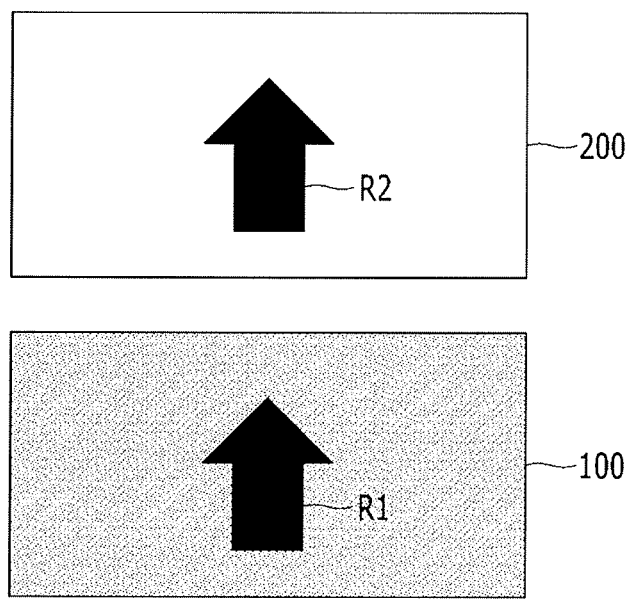
FIG. 2 is a top plan view that illustrates alignment directions in first and second plates included in an optical modulation device according to an exemplary embodiment of the present disclosure.
Figure 3:
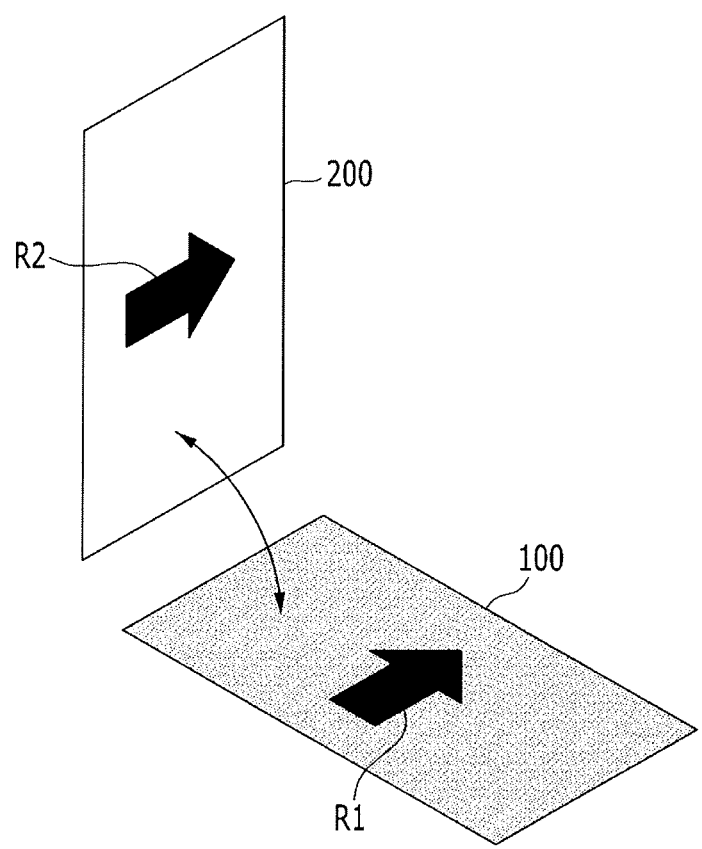
FIG. 3 illustrates a process of combining the first and second plates shown in FIG. 2.

FIG. 1 is a perspective view of an optical modulation device according to an exemplary embodiment of the present disclosure, FIG. 2 is a top plan view that illustrates alignment directions in first and second plates included in an optical modulation device according to an exemplary embodiment of the present disclosure, FIG. 3 illustrates a process of combining the first and second plates shown in FIG. 2.

Referring to FIG. 1, an optical modulation device 1 according to an exemplary embodiment of the present disclosure includes a first plate 100 and a second plate 200 that face each other, and a liquid crystal layer 3 disposed therebetween.

According to an embodiment, the first plate 100 includes a first substrate 110 that may be made with glass, plastic, etc. The first substrate 110 may be rigid or flexible, and it may be flat. In addition, at least part of the first substrate 110 may be bent.

A plurality of lower electrodes 191 are disposed on the first substrate 110. The lower electrode 191 includes a conductive material and may include a transparent conductive material such as ITO and IZO, metal, etc. The lower electrode 191 can receive a voltage from a voltage applying unit, and different lower electrodes 191 can receive different voltages.

According to an embodiment, the plurality of the lower electrodes 191 are arranged in a predetermined direction, for example, an x-axis direction, and each lower electrode 191 is elongated in a direction perpendicular to the arranged direction, for example, a y-axis direction.

A width of a space G between adjacent lower electrodes 191 can be adjusted depending on a design of the optical modulation device. A ratio of a width of the lower electrode 191 and the width of the space G adjacent to the lower electrode 191 is approximately N:1, where N is a real number of 1 or more.

According to an embodiment, the second plate 200 includes a second substrate 210 that may be made of glass, plastic, or the like. The second substrate 210 may be rigid or flexible, and it may be flat or at least a part thereof may be bent.

An upper electrode 290 is disposed on the second substrate 210. The upper electrode 290 includes a conductive material, and it may include a transparent conductive material such as ITO and IZO, metal, etc. The upper electrode 290 can receive a predetermined voltage from a voltage applying unit. The upper electrode 290 may have a plate shape formed on the entire second substrate 210, and may be patterned to have a plurality of separated portions.

The liquid crystal layer 3 includes a plurality of liquid crystal molecules 31. The liquid crystal molecules 31 have a negative dielectric anisotropy so that they can align in a direction transverse to a direction of an electric field generated in the liquid crystal layer 3. The liquid crystal molecules 31 are substantially vertically aligned to the first and second plate 100 and 200 when no electric field is generated in the liquid crystal layer 3, and are pre-tilted in a predetermined direction. The liquid crystal molecules 31 may be nematic liquid crystal molecules.

According to an embodiment, a height d of a cell gap of the liquid crystal layer 3 may substantially satisfy Equation 1 with respect to light having a predetermined wavelength λ. Accordingly, the optical modulation device 1 according to an exemplary embodiment of the present disclosure may substantially function as a half-wavelength plate and be used as a diffraction grid, a lens, etc.

$$\frac{\lambda}{2} \times 1.3 \geq \Delta nd \geq \frac{\lambda}{2} \qquad \text{(Equation 1)}$$

In Equation 1, Δnd is a phase retardation value of light passing through the liquid crystal layer 3, where n is related to the refractive index and d is the cell gap.

A first aligner 11 is disposed on an inner surface of the first plate 100, and a second aligner 21 is disposed on an inner surface of the second plate 200. According to embodiments, the first aligner 11 and the second aligner 21 are vertical alignment layers and can generate an alignment force through various methods, such as a rubbing process and a photo-alignment process, to determine pre-tilt directions of liquid crystal molecules 31 close to the first and second plates 100 and 200. For a rubbing process, the vertical alignment layer may be an organic vertical alignment layer. For a photo-alignment process, a photo-polymerization material can be formed by irradiating light, such as ultraviolet light, after coating a photosensitive polymer alignment material on the inner surfaces of the first and second plates 100 and 200.

Referring to FIG. 2, alignment directions R1 and R2 of two aligners 11 and 21 disposed on the inner surfaces of the first and second plates 100 and 200 are substantially parallel to each other. Further, the alignment directions R1 and R2 of the aligners 11 and 21 are constant.

A misalignment of the first plate 100 and the second plate 200 may occur, and a difference between the azimuthal angle of the first aligner 11 of the first plate 100 and the azimuthal angle of the second aligner 21 of the second plate 200 may be approximately ±5, but embodiments are not limited thereto.

Referring to FIG. 3, the optical modulation device 1 according to an exemplary embodiment of the present disclosure can be formed by aligning and assembling the first plate 100 and the second plate 200 in which the aligners 11 and 21 are aligned to be substantially parallel.

Unlike those shown in FIG. 3, vertical positions of the first plate 100 and the second plate 200 may change.

As such, the aligners 11 and 21 on the first and second plates 100 and 200 of the optical modulation device 1 according to an exemplary embodiment of the present disclosure are parallel to each other, and since the alignment directions of the aligners 11 and 21 are substantially constant, a process of aligning an optical modulation device can be simplified, which can simplify the process of manufacturing the optical modulation device 1 due to a less complicated alignment process. Accordingly, it is possible to prevent defects in an optical modulation device or an optical device including the same due to alignment defects. Accordingly, an optical modulation device may be made larger.

Next, an operation of an optical modulation device according to an exemplary embodiment of the present disclosure will be described with reference to FIGS. 4 to 7, in addition to FIGS. 1 to 3 described above.

Figure 4:
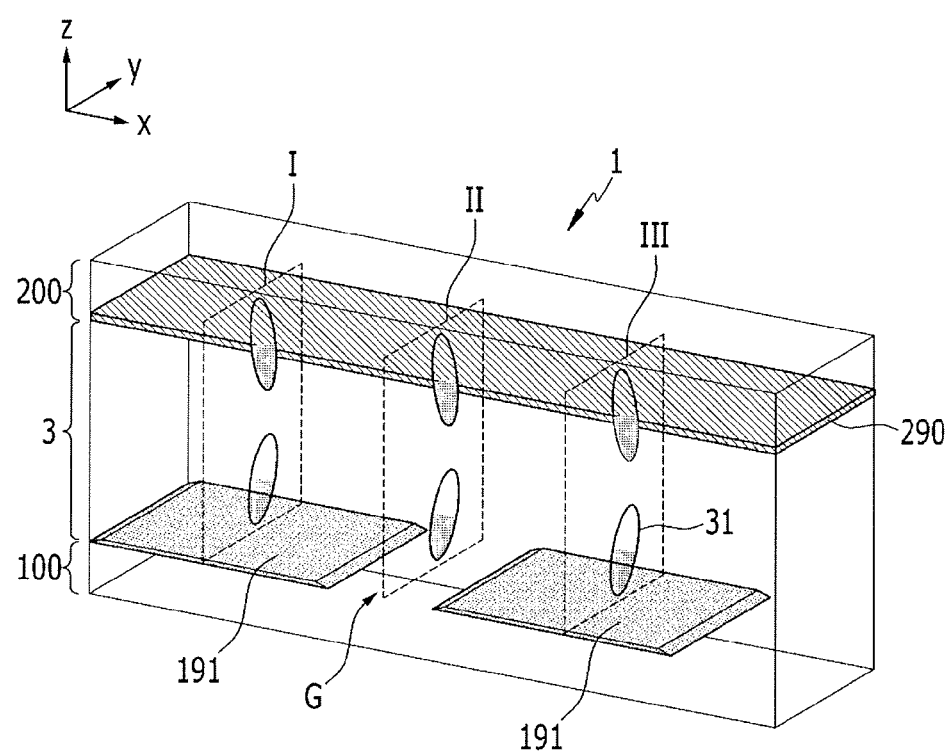
FIG. 4 is a perspective view that illustrates alignment of liquid crystal molecules when there is no voltage difference between first and second plates of an optical modulation device according to an exemplary embodiment of the present disclosure.
Figure 5:
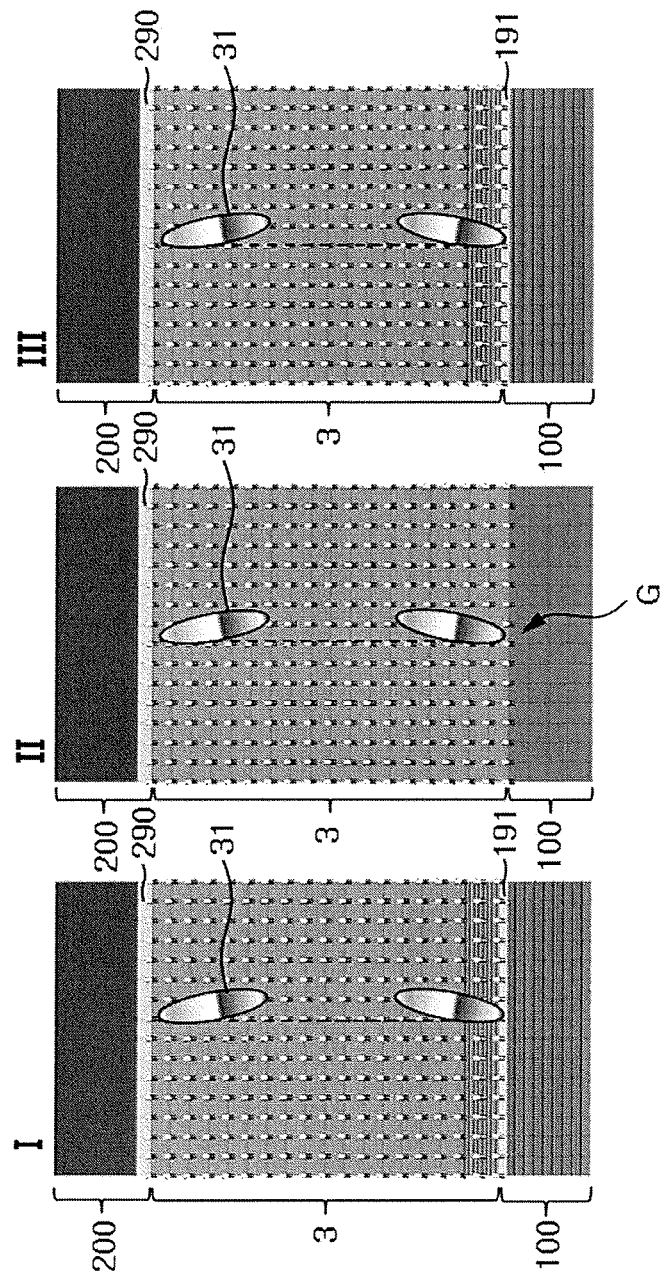
FIG. 5 shows cross-sectional views of an optical modulation device of FIG. 4 taken along lines I, II, and III.

Referring to FIGS. 4 and 5, when no voltage difference is generated between the lower electrode 191 of the first plate 100 and the upper electrode 290 of the second plate 200, and thus no electric field is generated in the liquid crystal layer 3, the liquid crystal molecules 31 have an initial pre-tilt. FIG. 5 includes cross-sectional views taken along line I through one of the lower electrodes 191 of the optical modulation device 1 shown in FIG. 4, a cross-sectional view taken along line II through the space G between two adjacent lower electrodes 191, and a cross-sectional view taken along line III through a lower electrode 191 adjacent to the lower electrode 191 of line I, and referring to FIG. 5, the alignment of the liquid crystal molecules 31 may be substantially constant.

FIG. 5 shows that some liquid crystal molecules 31 extend into a region of the first plate 100 or second plate 200, but this is for convenience of illustration. However, the liquid crystal molecules 31 do not substantially extend into the region of the first plate 100 or the second plate 200, and this is the same for the drawings below.

Since the liquid crystal molecules 31 adjacent to the first and second plates 100 and 200 are initially aligned with the parallel alignment directions of the aligners 11 and 21, the pre-tilt directions of the liquid crystal molecules 31 adjacent to the first plate 100 are opposite to the pre-tilt direction of the liquid crystal molecules 31 adjacent to the second plate 200, rather than being parallel to each other. That is, the liquid crystal molecules 31 adjacent to the first plate 100 and the liquid crystal molecules 31 adjacent to the second plate 200 are tilted symmetrically to each with respect to a horizontal center line that extends along the center of the liquid crystal layer 3 of the cross-sectional view. For example, when the liquid crystal molecules 31 adjacent to the first plate 100 are tilted to the right, the liquid crystal molecules 31 adjacent to the second plate 200 are tilted to the left.

Figure 6:
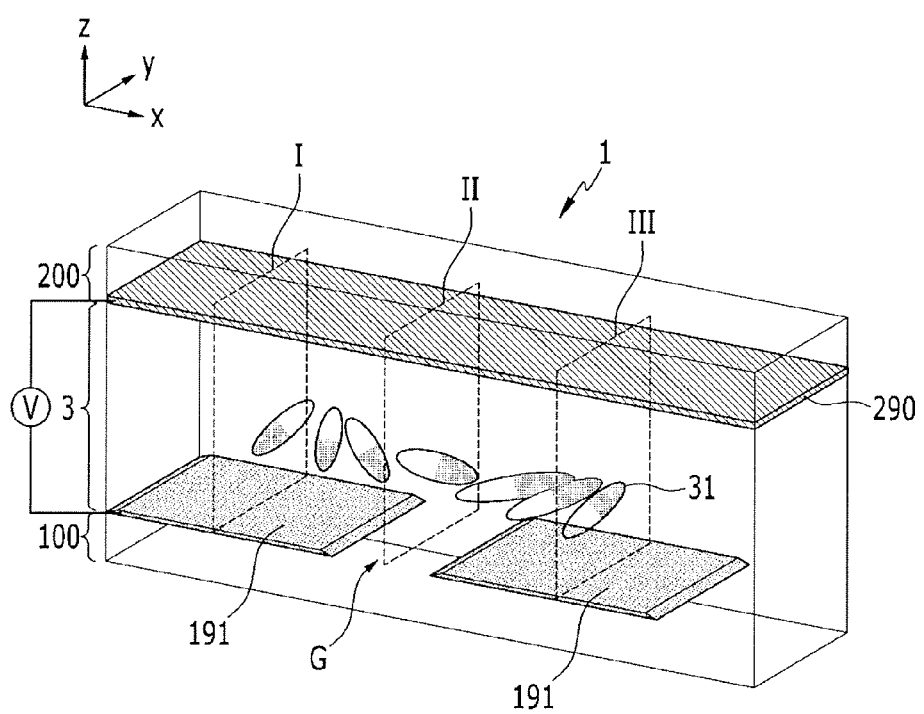
FIG. 6 is a perspective view that illustrates alignment of liquid crystal molecules when there is a voltage difference between first and second plates of an optical modulation device according to an exemplary embodiment of the present disclosure.
Figure 7:
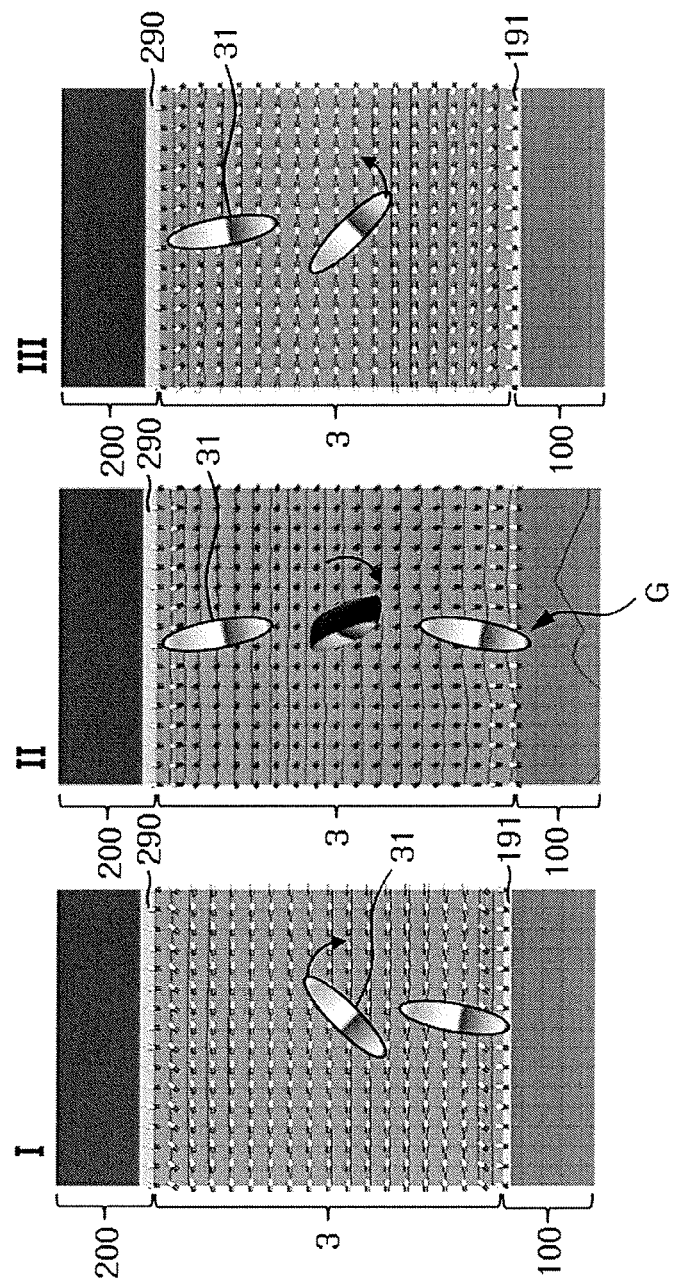
FIG. 7 shows cross-sectional views of an optical modulation device of FIG. 6 taken along lines I, II, and III.

Referring to FIGS. 6 and 7, when a voltage difference greater than or equal to a threshold voltage is applied between the lower electrode 191 and the upper electrode 290, and thus an electric field is generated in the liquid crystal layer 3, the liquid crystal molecules 31 tilt in a direction perpendicular to the direction of the electric field. As a result, as shown in FIGS. 6 and 7, most of the liquid crystal molecules 31 substantially tilt parallel to the surfaces of the first or second plates 100 and 200 to form an in-plane alignment, and long axes of the liquid crystal molecules 31 rotate and align in-plane. An in-plane alignment means that the long axes of the liquid crystal molecules 31 are aligned parallel to the surfaces of the first or second plates 100 and 200.

In this case, the in-plane rotation angles, that is, the azimuthal angles of the liquid crystal molecules 31, may vary depending on the voltage applied to the lower electrodes 191 and upper electrode 290, and as a result, the angles may spirally vary as a function of position in the x-axis direction.

Next, a method of implementing a forward phase slope using the optical modulation device 1 according to an exemplary embodiment of the present disclosure will be described with reference to FIGS. 8 to 12 in addition to the drawings described above.

Figure 8:
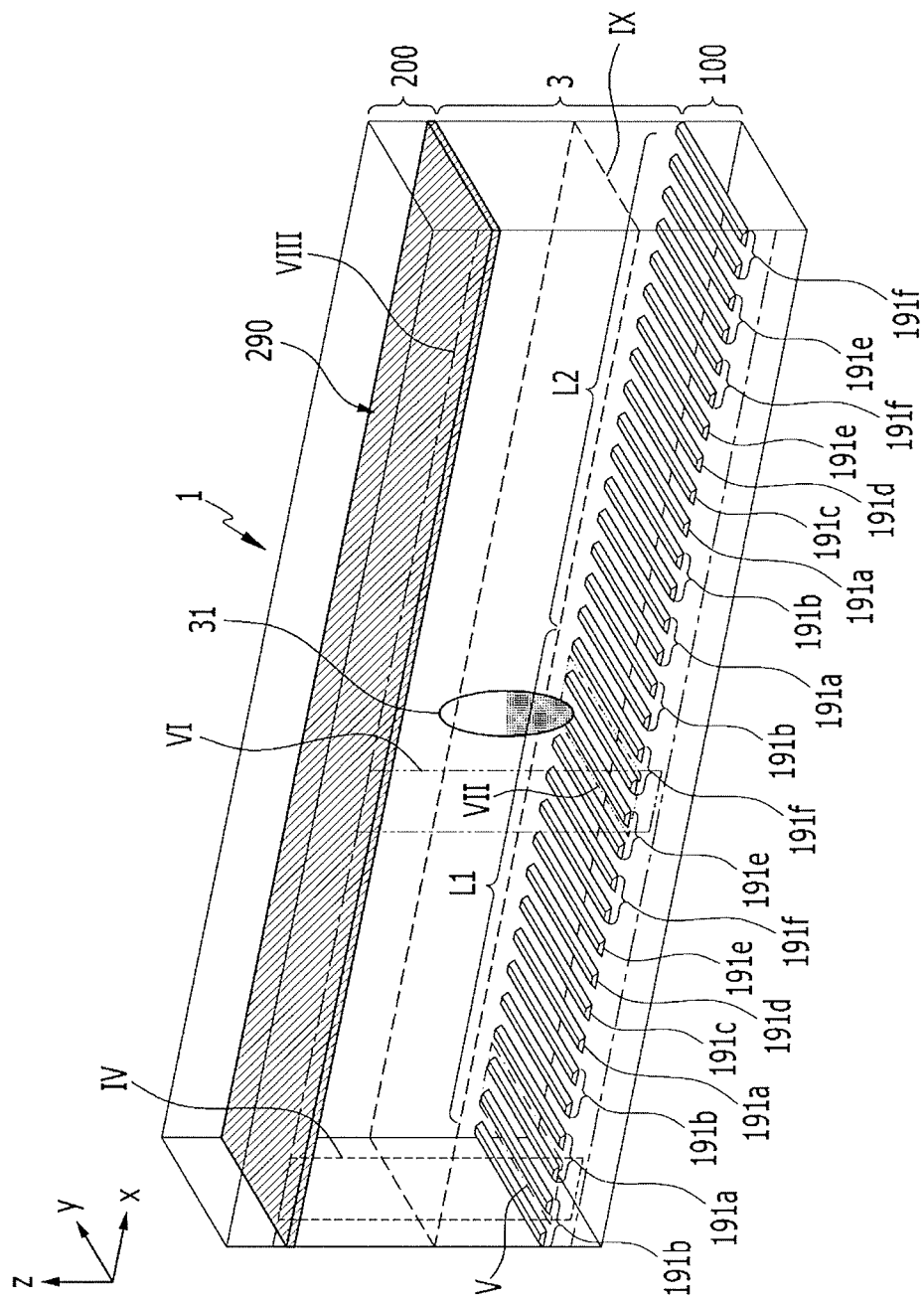
FIG. 8 is a perspective view of an optical modulation device according to an exemplary embodiment of the present disclosure.

FIG. 8 illustrates the optical modulation device 1 containing liquid crystals according to an exemplary embodiment of the present disclosure, and has substantially the same structure as an exemplary embodiment described above. The optical modulation device 1 can form a plurality of lenses that extend in a y-axis direction and are aligned along an x-axis direction. The optical modulation device 1 as shown in FIG. 8 that forms two lenses will be described. Each of the lenses includes a plurality of unit areas, and each of the unit areas may include at least one lower electrode 191.

Figure 12:
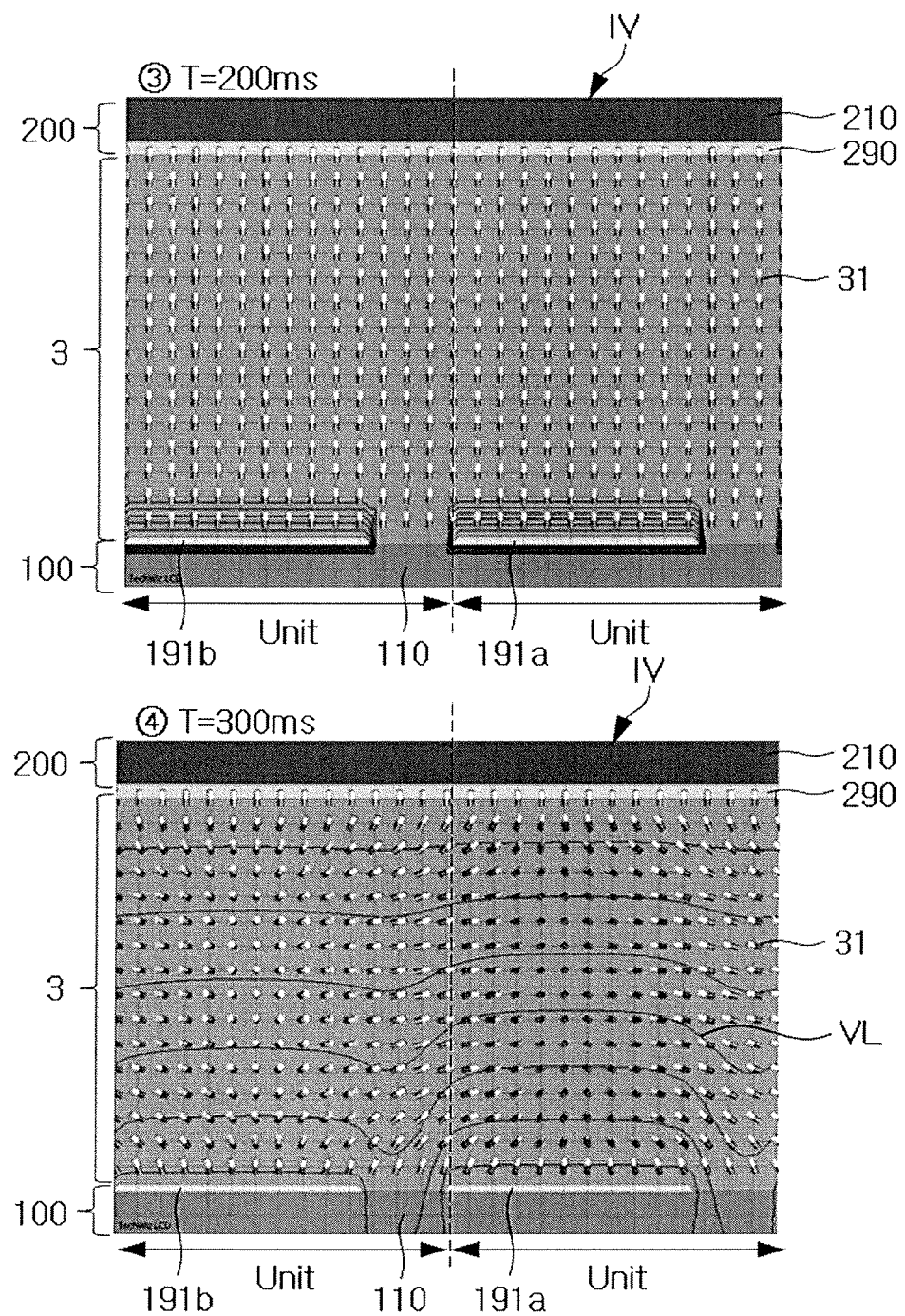
FIG. 12 shows cross-sectional views taken along line IV of FIG. 8, which illustrate alignment of liquid crystal molecules when a second step driving signal is applied to a first plate and second plate of an optical modulation device according to an exemplary embodiment of the present disclosure and when a third step driving signal is applied thereto.

Referring to the upper view of FIG. 12, when the same voltage is applied to the first and second electrodes 191a and 191b and the upper electrode 290, the liquid crystal molecules 31 are substantially aligned in a direction approximately perpendicular to the planes of the first and second plates 100 and 200, and may form pre-tilts depending on the alignment directions of the first plate 100 and the second plate 200, as described above.

Figure 9:
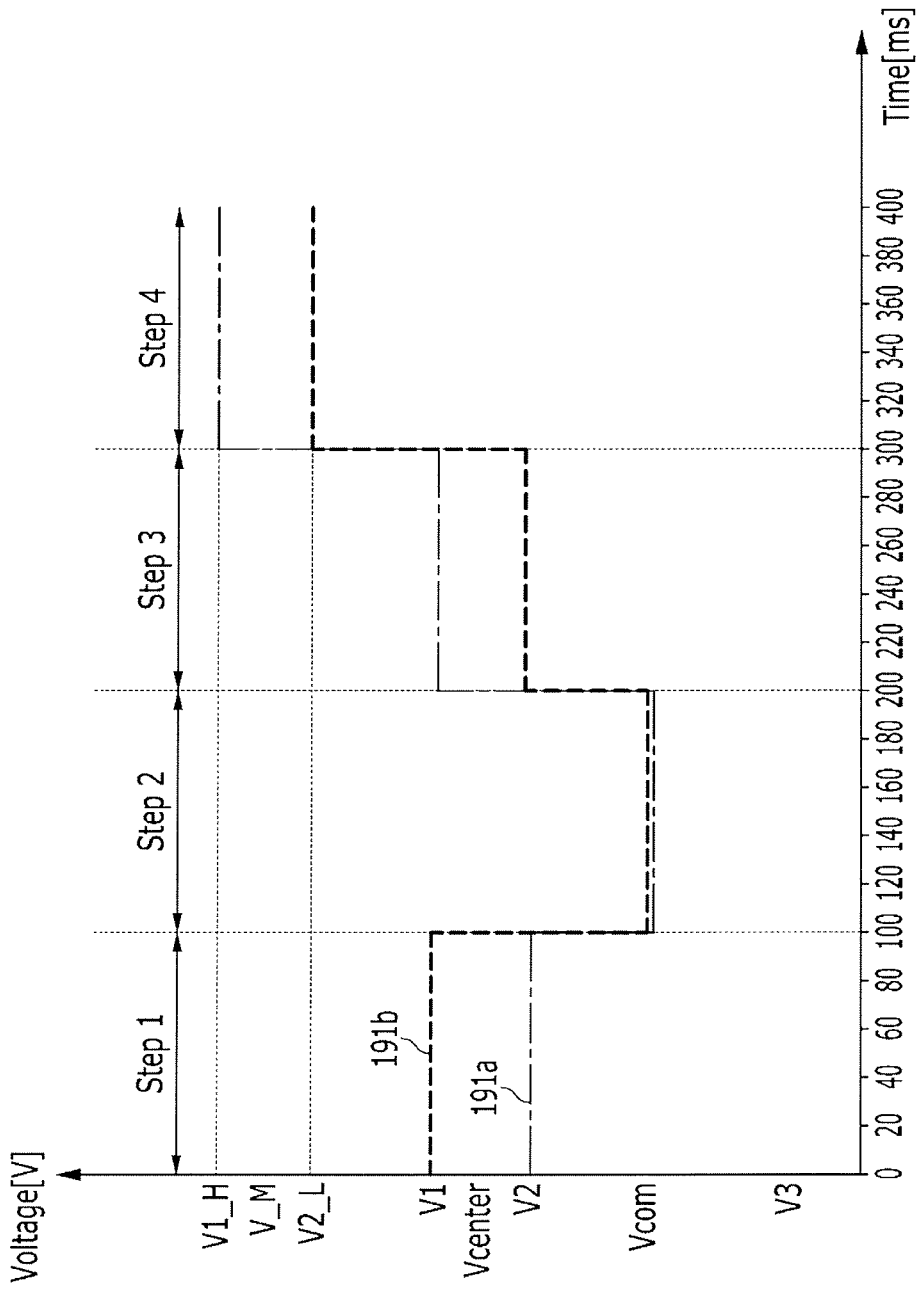
FIGS. 9 to 11 are timing diagrams of driving signals of an optical modulation device according to an exemplary embodiment of the present disclosure.

Referring to FIG. 9, first, to implement a forward phase slope in the optical modulation device 1 according to an exemplary embodiment of the present disclosure, the adjacent lower electrodes 191b and 191c and the upper electrode 290 may receive a third step (step 3) driving signal for one frame. In the third step (step 3), a voltage difference is formed between the electrodes 191a and 191b of the first plate 100 and the electrode 290 of the second plate 200, and a voltage difference is formed even between the adjacent first and second electrodes 191a and 191b. For example, an absolute value of a first voltage applied to the first electrode 191a may be greater than an absolute value of a second voltage applied to the second electrode 191b.

Further, a voltage applied to the upper electrode 290 is different from voltages applied to the lower electrodes 191a and 191b. For example, the voltage applied to the upper electrode 290 may be less than the absolute values of the voltages applied to the lower electrodes 191a and 191b. For example, voltages of 4 V, 6 V, and 0 V may be respectively applied to the first electrode 191a, the second electrode 191b, and the upper electrode 290.

In addition, when the unit area includes a plurality of lower electrodes 191, the same voltage may be applied to all of the plurality of lower electrodes 191 of one unit area, and voltages may be applied that sequentially change for a unit of at least one lower electrode 191. In this case, voltages can be applied to the lower electrodes 191 of one unit area that gradually increase for a unit of at least one lower electrode 191 of the unit area, and voltages can be applied to the lower electrode 191 of the other unit area that gradually decrease for a unit of at least one lower electrode 191 of the other unit area.

According to an embodiment, the voltages applied to the lower electrodes 191 of all units have a constant positive or negative polarity with respect to the voltage of the upper electrode 290. Further, the polarity of the voltage applied to the lower electrodes 191 may reverse with a cycle of at least one frame.

Figure 13:
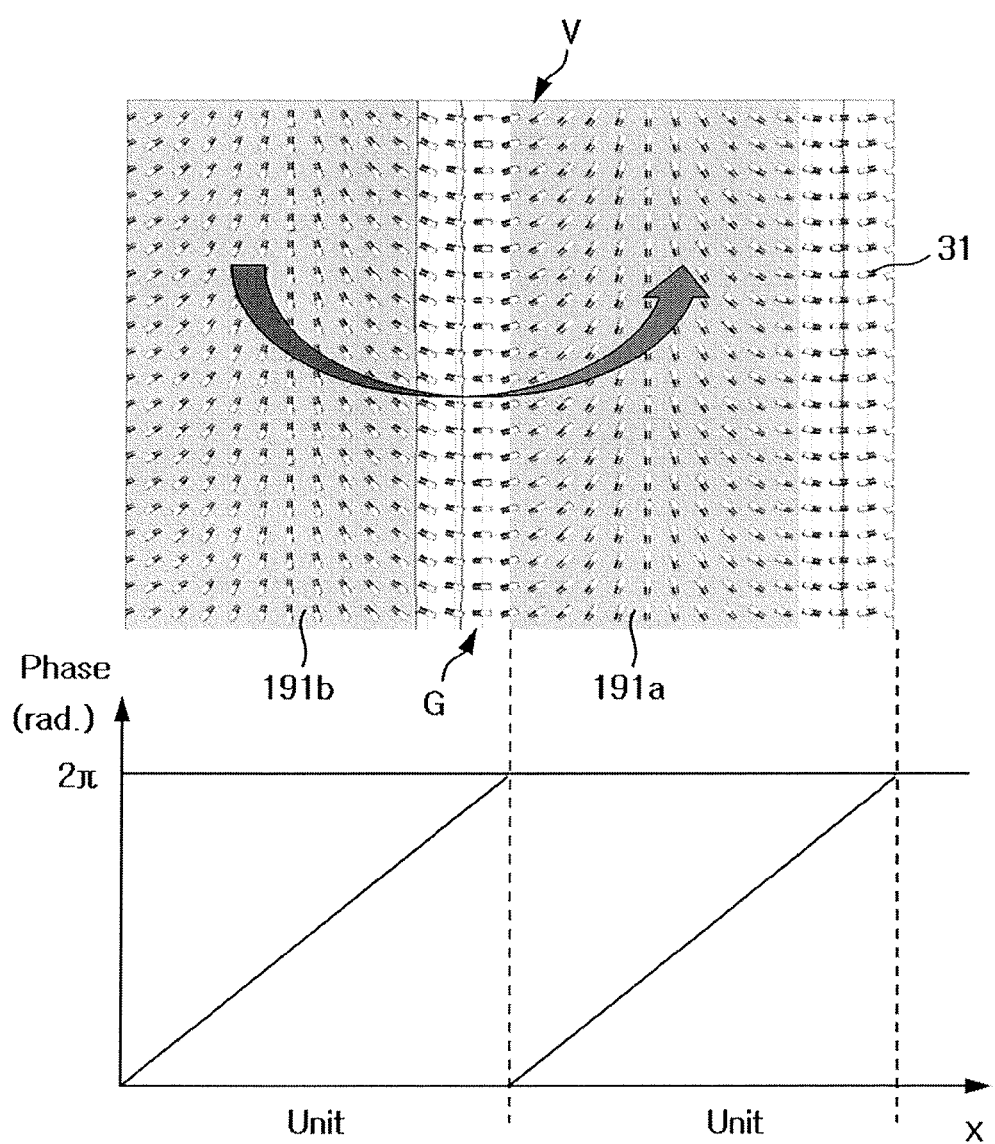
FIG. 13 shows a cross-sectional view taken along line V of FIG. 8 and a graph of a phase change corresponding to the cross-sectional view, which illustrate alignment of liquid crystal molecules when a third step driving signal is applied to an optical modulation device according to an exemplary embodiment of the present disclosure and when the liquid crystal molecules have stabilized.
Figure 14:
FIG. 14 illustrates alignment of liquid crystal molecules when a third step driving signal is applied to an optical modulation device according to an exemplary embodiment of the present disclosure and when the liquid crystal molecules have stabilized.

Next, as in the lower views of FIG. 12 and FIG. 13, the liquid crystal molecules 31 realign due to the electric field generated in the liquid crystal layer 3. More specifically, most of the liquid crystal molecules 31 tilt substantially parallel to the surfaces of the first or second plates 100 and 200 to form an in-plane alignment, and long axes thereof rotate in-plane to form a spiral alignment as shown in FIGS. 13 and 14, and more particularly, to form a u-shaped alignment. In the liquid crystal molecules 31, azimuthal angles of the long axes of the liquid crystal molecules 31 may change from about 0° to about 180°. A region where the azimuthal angles of the long axes of the liquid crystal molecules 31 change from about 0° to about 180° may exhibit a u-shaped alignment.

It can take a certain amount of time until the alignment of the liquid crystal molecules 31 stabilizes after the optical modulation device 1 receives the third step (step 3) driving signal. In addition, the optical modulation device 1 that forms a forward phase slope may receive a fourth step (step 4) driving signal to further stabilize the alignment of the liquid crystal molecules 31.

Referring to FIG. 13, the liquid crystal molecules 31 rotate 180° along the x-axis direction, and the aligned region may define one unit area. In a present exemplary embodiment, one unit area includes a space G between the adjacent first and second electrodes 191a and 191b.

As described above, when the optical modulation device 1 is implemented as a half-wavelength plate that substantially satisfies Equation 1, a rotation direction of the incident circularly-polarized light is reversed. FIG. 13 illustrates a phase change as a function of position in the x-axis direction when right circularly-polarized light is incident to the optical modulation device 1. The right circularly-polarized light passing through the optical modulation device 1 changes to left circularly-polarized light, and since the phase retardation value of the liquid crystal layer 3 varies in the x-axis direction, the phase of the emitted circularly-polarized light continuously changes.

In general, when an optical axis of a half-wavelength plate rotates in-plane by $\phi$, the phase of the emitted light changes by $2\phi$, and as a result, the phase of the light emitted from one unit area in which the azimuthal angle of the long axes of the liquid crystal molecules 31 has changed to 180° changes from 0 to $2\pi$ radian in the x-axis direction, as shown in FIG. 13. This is referred to as a forward phase slope. The phase change may repeat for each unit area, and the forward phase slope portion of a lens that changes light direction can be implemented using the optical modulation device 1.

Next, a method of implementing a forward phase slope as shown in FIG. 13 in the optical modulation device 1 according to an exemplary embodiment of the present disclosure will be described with reference to FIGS. 15 to 18 in addition to the drawings described above.

In a present exemplary embodiment, two lower electrodes 191e and 191f respectively disposed in two adjacent unit areas will be specifically described. The two lower electrodes 191e and 191f are referred to as a fifth electrode 191e and a sixth electrode 191f, respectively.

Figure 15:
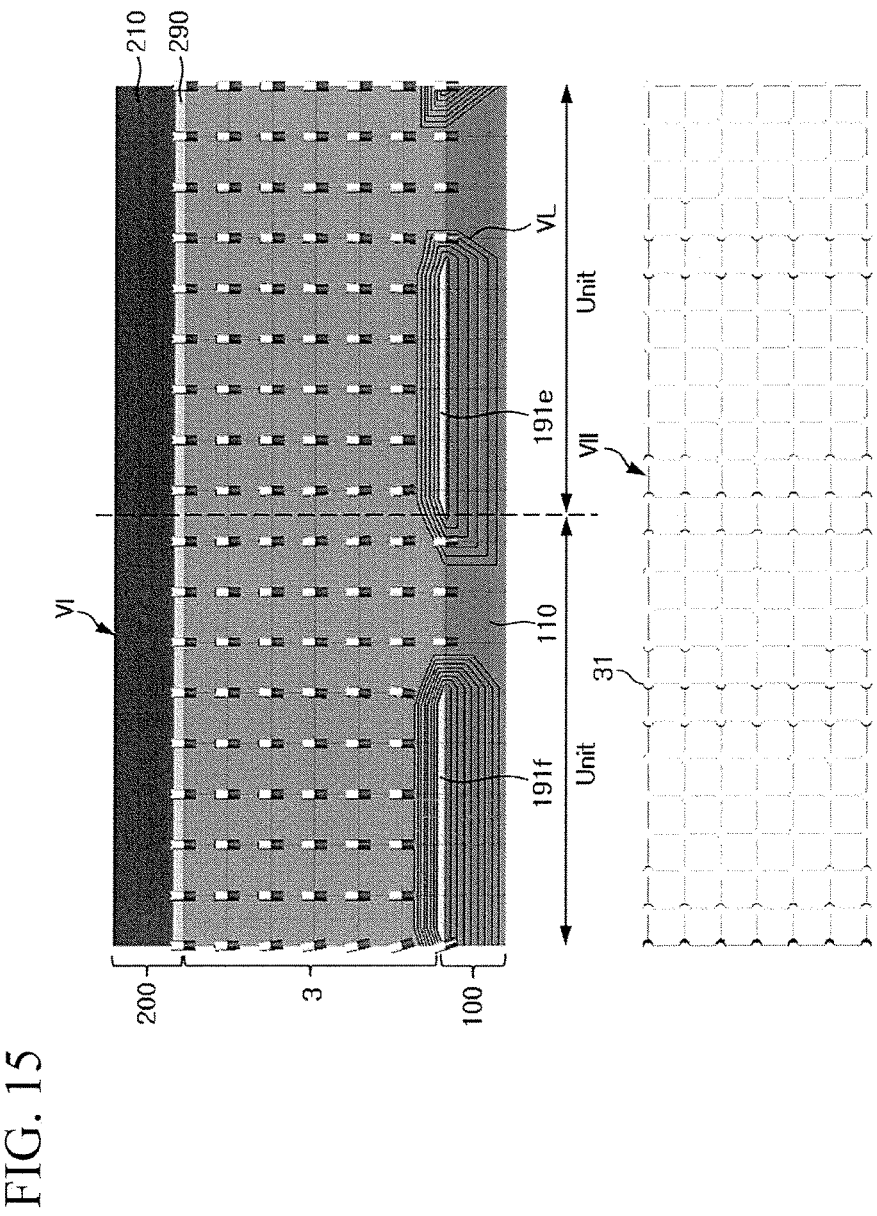
FIG. 15 shows cross-sectional views taken along lines VI and VII of FIG. 8, which illustrate alignment of liquid crystal molecules before a voltage difference between a first plate and second plate of an optical modulation device according to an exemplary embodiment of the present disclosure occurs.

FIG. 15 is a cross-sectional view taken along line VI of FIG. 8 and a cross-sectional view taken along line VII of FIG. 8, which are cross-sectional views that illustrate alignment of the liquid crystal molecules 31 before a voltage difference is applied to the fifth and sixth electrodes 191e and 191f and the upper electrode 290 of the optical modulation device 1.

The liquid crystal molecules 31 are initially aligned in a direction substantially perpendicular to the planes of the first and second plates 100 and 200, and as described above, the liquid crystal molecules 31 may be pre-tilted due to the alignment directions R1 and R2 of the first and second plates 100 and 200. An equipotential line VL is shown in the liquid crystal layer 3.

Figure 16:
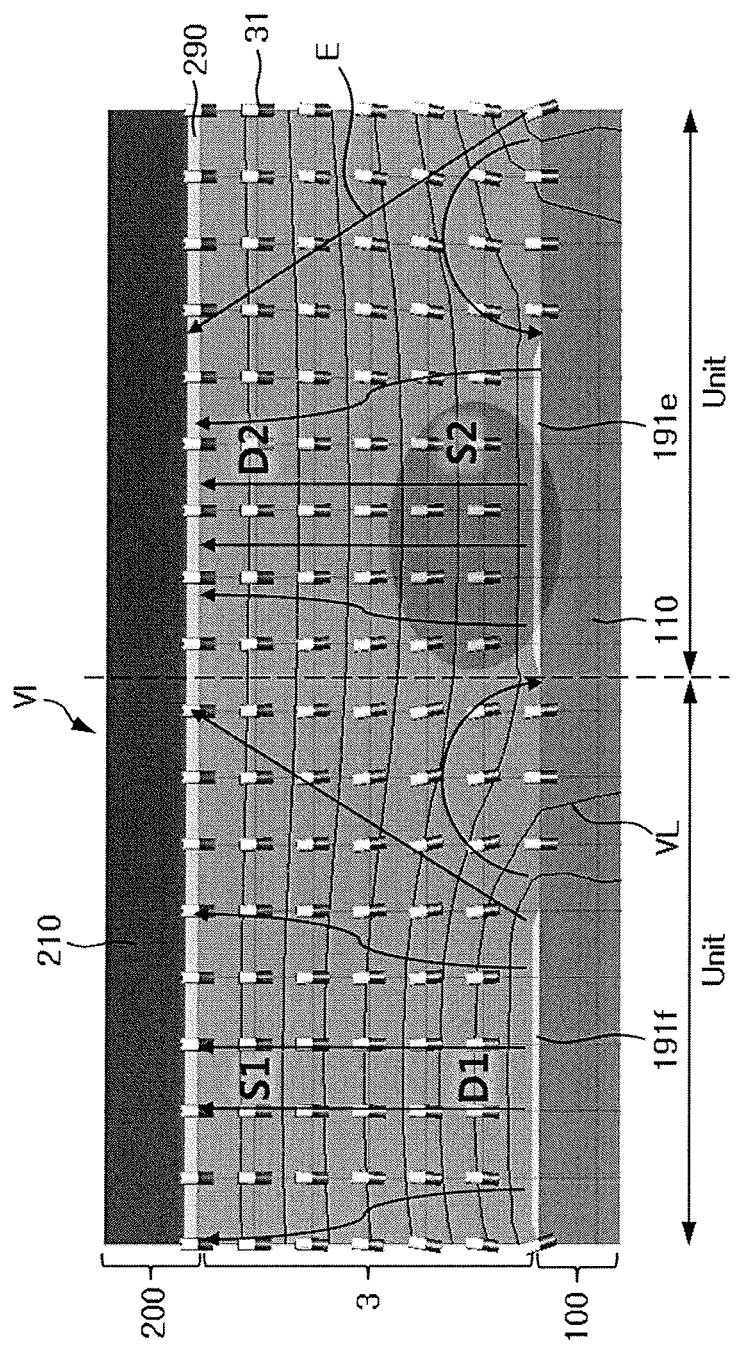
FIG. 16 is a cross-sectional view taken along line VI of FIG. 8, which illustrates alignment of liquid crystal molecules immediately after a first step driving signal is applied to an optical modulation device according to an exemplary embodiment of the present disclosure.

FIG. 16 illustrates a cross-sectional view taken along line VI of FIG. 8, which illustrates alignment of the liquid crystal molecules 31 immediately after a first step (step 1) driving signal is applied to the fifth and sixth electrodes 191e and 191f of the first plate 100 and the electrode 290 of the second plate 200 of the optical modulation device 1. An electric field E is generated between the first plate 100 and the second plate 200, and as a result, the equipotential line VL is shown. In this case, since the fifth and sixth electrodes 191e and 191f have edge sides, as shown in FIG. 16, a fringe field is formed between the edge sides of the fifth and sixth electrodes 191e and 191f and the upper electrode 290.

In the liquid crystal layer 3 of a unit area that includes the sixth electrode 191f immediately after the first step (step 1) driving signal is applied to the fifth and sixth electrodes 191e and 191f and the upper electrode 290, the intensity of the electric field in an area D1 adjacent to the first plate 100 is greater than the intensity of the electric field in an area S1 adjacent to the second plate 200. In addition, in the liquid crystal layer 3 of a unit including the fifth electrode 191e, the intensity of the electric field in an area S2 adjacent to the first plate 100 is less than the intensity of the electric field in an area D2 adjacent to the second plate 200.

Figure 11:
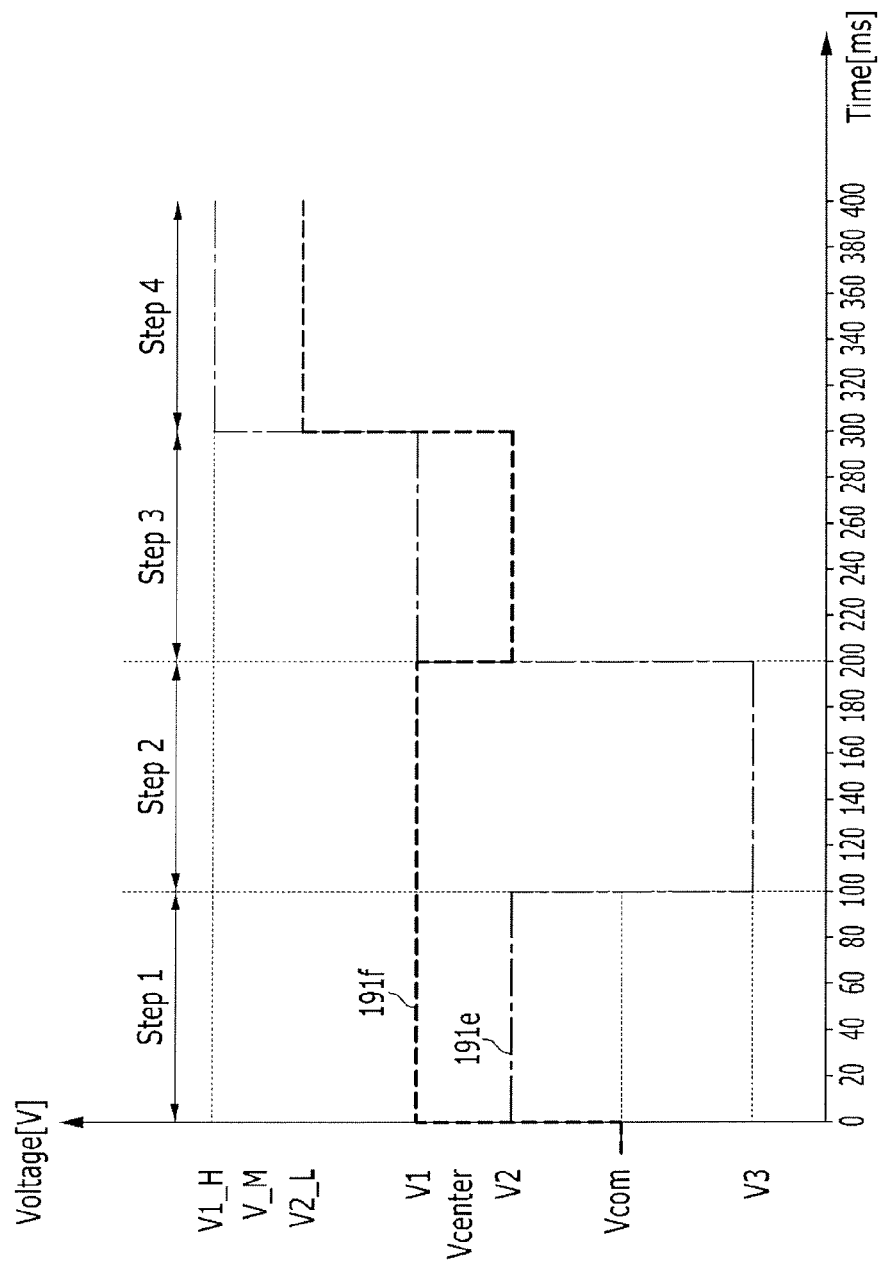

Since there is a difference even between the voltages applied to the fifth electrode 191e and the sixth electrode 191f of two adjacent unit areas, as shown in FIG. 16, the intensity of the electric field in the area S2 adjacent to the fifth electrode 191e is less than the intensity of the electric field in the area D1 adjacent to the sixth electrode 191f. For this purpose, as shown in FIG. 11 described above, the voltage V1 applied to the sixth electrode 191f is greater than the voltage V2 applied to the fifth electrode 191e. A voltage different from the voltages applied to the fifth and sixth electrodes 191e and 191f, more specifically, a voltage Vcom less than the voltages applied to the fifth and sixth electrodes 191e and 191f, is applied to the upper electrode 290.

Figure 17:
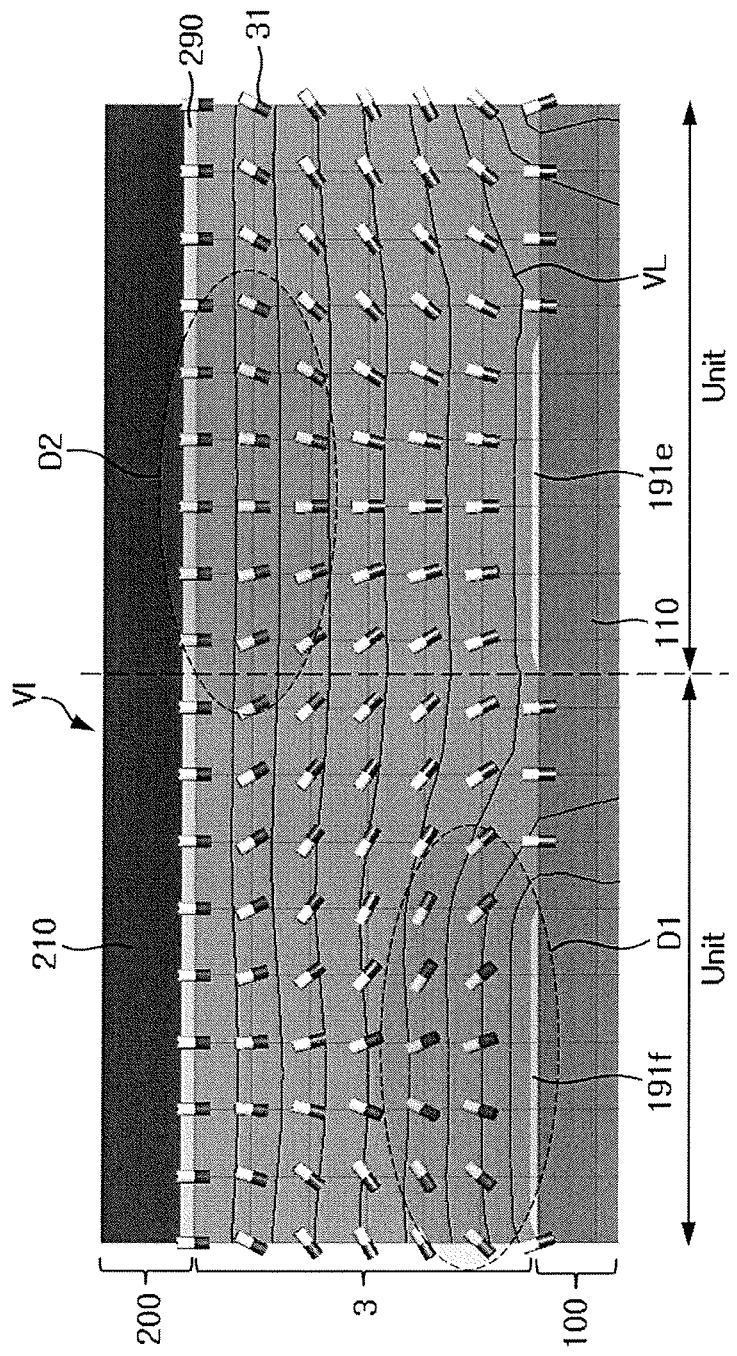
FIG. 17 is a cross-sectional view taken along line VI of FIG. 8, which illustrates alignment of liquid crystal molecules before the liquid crystal molecules have stabilized after a first step driving signal is applied to an optical modulation device according to an exemplary embodiment of the present disclosure.

FIG. 17 is a cross-sectional view taken along line VI of FIG. 8, which illustrates alignment of the liquid crystal molecules 31 that respond to an electric field E generated in the liquid crystal layer 3 after the first step (step 1) driving signal is applied in the optical modulation device 1 shown in FIG. 8. As described above, since the electric field in the area D1 of the liquid crystal layer 3 adjacent to the sixth electrode 191f is greatest, the tilt direction of the liquid crystal molecules 31 in the area D1 determines the in-plane alignment direction of the liquid crystal molecules 31 corresponding to the sixth electrode 191f. Accordingly, in an area corresponding to the sixth electrode 191f, the liquid crystal molecules 31 adjacent to the first plate 100 tilt in the initial pre-tilt direction to form the in-plane alignment.

On the contrary, in the liquid crystal layer 3 corresponding to the fifth electrode 191e, since the electric field is greatest in the area D2 adjacent to the upper electrode 290, not to the fifth electrode 191e, the tilt direction of the liquid crystal molecules 31 of the area D2 determines the in-plane alignment direction of the liquid crystal molecules 31. Accordingly, in the area corresponding to the fifth electrode 191e, the liquid crystal molecules 31 adjacent to the second plate 200 tilt in the initial pre-tilt direction to form the in-plane alignment. Since the initial pre-tilt direction of the liquid crystal molecules 31 adjacent to the first plate 100 are opposite to the initial pre-tilt direction of the liquid crystal molecules 31 adjacent to the second plate 200, the tilt direction of the liquid crystal molecules 31 corresponding to the fifth electrode 191e is opposite to the tilt direction of the liquid crystal molecules 31 corresponding to the sixth electrode 191f.

Figure 18:
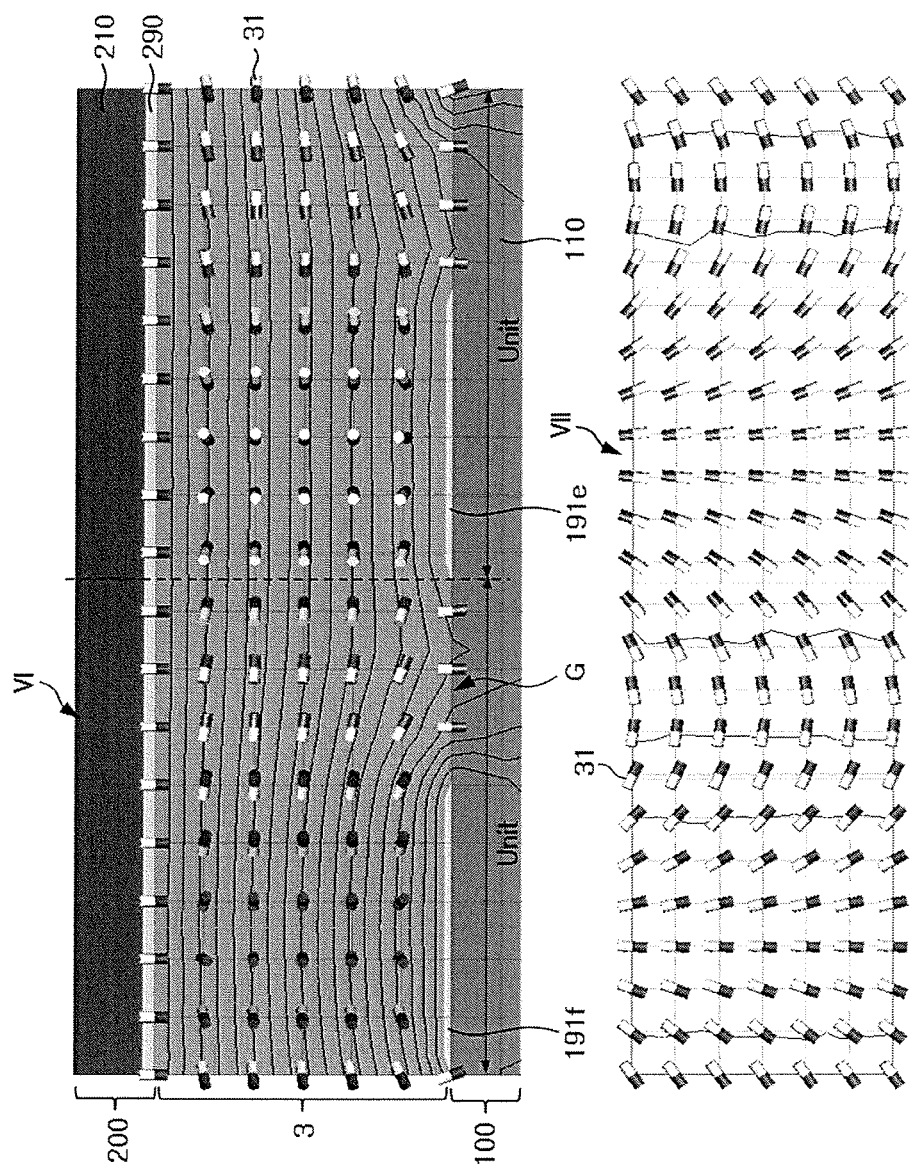
FIG. 18 shows cross-sectional views taken along lines VI and VII of FIG. 8, which illustrate alignment of liquid crystal molecules when the liquid crystal molecules have stabilized after a first step driving signal was applied to an optical modulation device according to an exemplary embodiment of the present disclosure.

FIG. 18 is a cross-sectional view taken along line VII of FIG. 8, which illustrates alignment of the liquid crystal molecules 31 that have stabilized after the first step (step 1) driving signal was applied to the optical modulation device 1 shown in FIG. 8. The in-plane alignment direction of the liquid crystal molecules 31 corresponding to the fifth electrode 191e is opposite to the in-plane alignment direction of the liquid crystal molecules 31 corresponding to the sixth electrode 191f, and the liquid crystal molecules 31 of the space G between the fifth and sixth electrodes 191e and 191f continuously rotate in the x-axis direction to form a spiral alignment.

The liquid crystal layer 3 of the optical modulation device 1 can provide a phase retardation of the incident light that changes along the x-axis direction.

Referring to FIG. 18, an area in which the liquid crystal molecules 31 are aligned by rotating 180° along the x-axis direction is defined as one unit area, and the unit area includes a space G between lower electrode 191e and another lower electrode 191f adjacent thereto. For example, when right circularly-polarized light is incident to the optical modulation device 1 having a forward phase slope, as in an exemplary embodiment of the present disclosure, the phase changes as a function of position in the x-axis direction, right circularly-polarized light changes to left circularly-polarized light, the phase retardation value of the liquid crystal layer 3 varies along the x-axis direction, and as a result, the phase of the emitted circularly-polarized light continuously changes.

Figure 20:
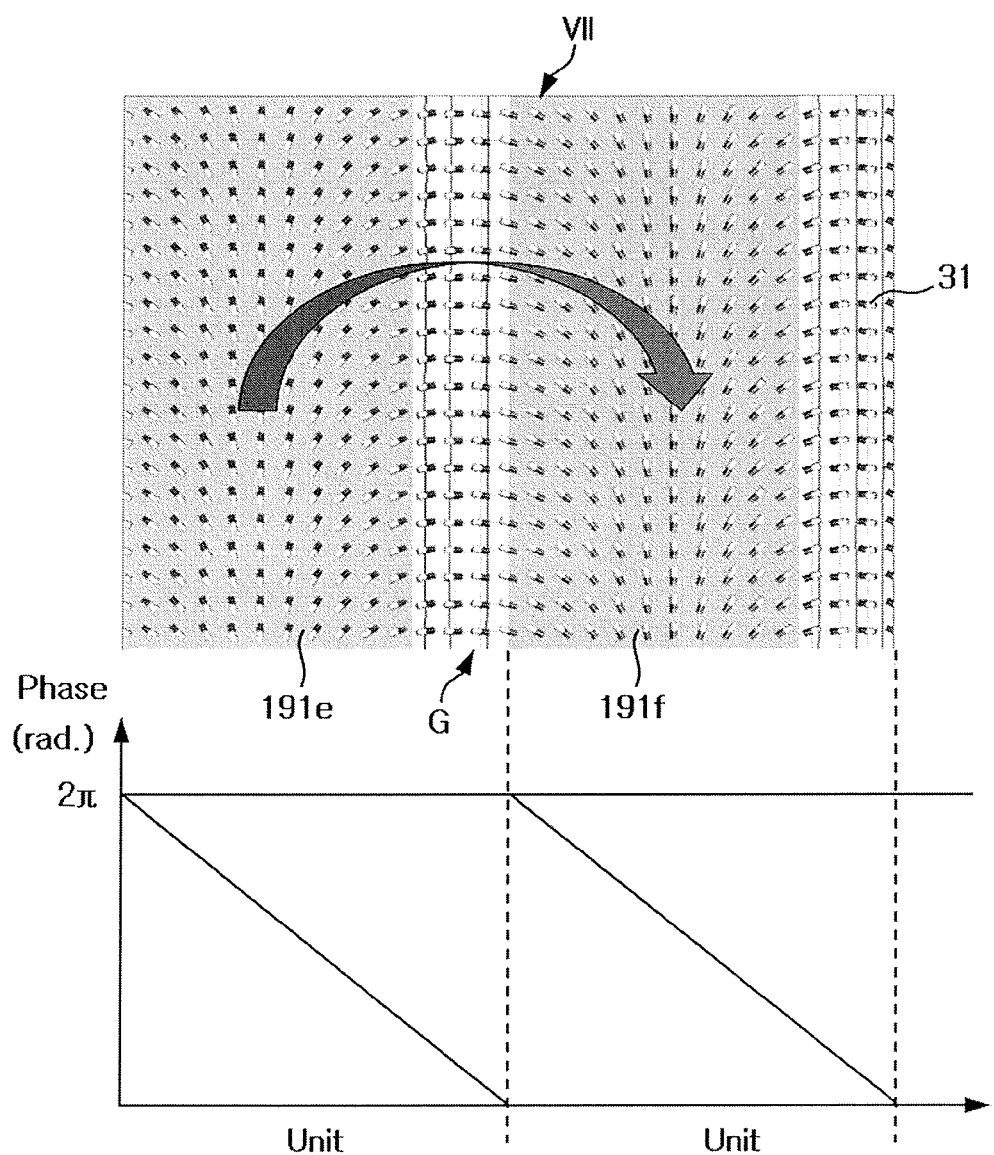
FIG. 20 shows cross-sectional view taken along line VII of FIG. 8 and a graph of a phase change corresponding to the cross-sectional view, which illustrate alignment of liquid crystal molecules when the liquid crystal molecules have stabilized after driving signals of steps 1 to 3 have been sequentially applied to an optical modulation device according to an exemplary embodiment of the present disclosure.
Figure 21:
FIG. 21 illustrates alignment of liquid crystal molecules when the liquid crystal molecules have stabilized after a third step driving signal was applied to an optical modulation device according to an exemplary embodiment of the present disclosure.

Hereinafter, a method of implementing a backward phase slope using the optical modulation device 1 according to an exemplary embodiment of the present disclosure will be described with reference to FIGS. 19 to 21 and the above-described drawings, particularly, FIGS. 11 and 15 to 18.

Figure 19:
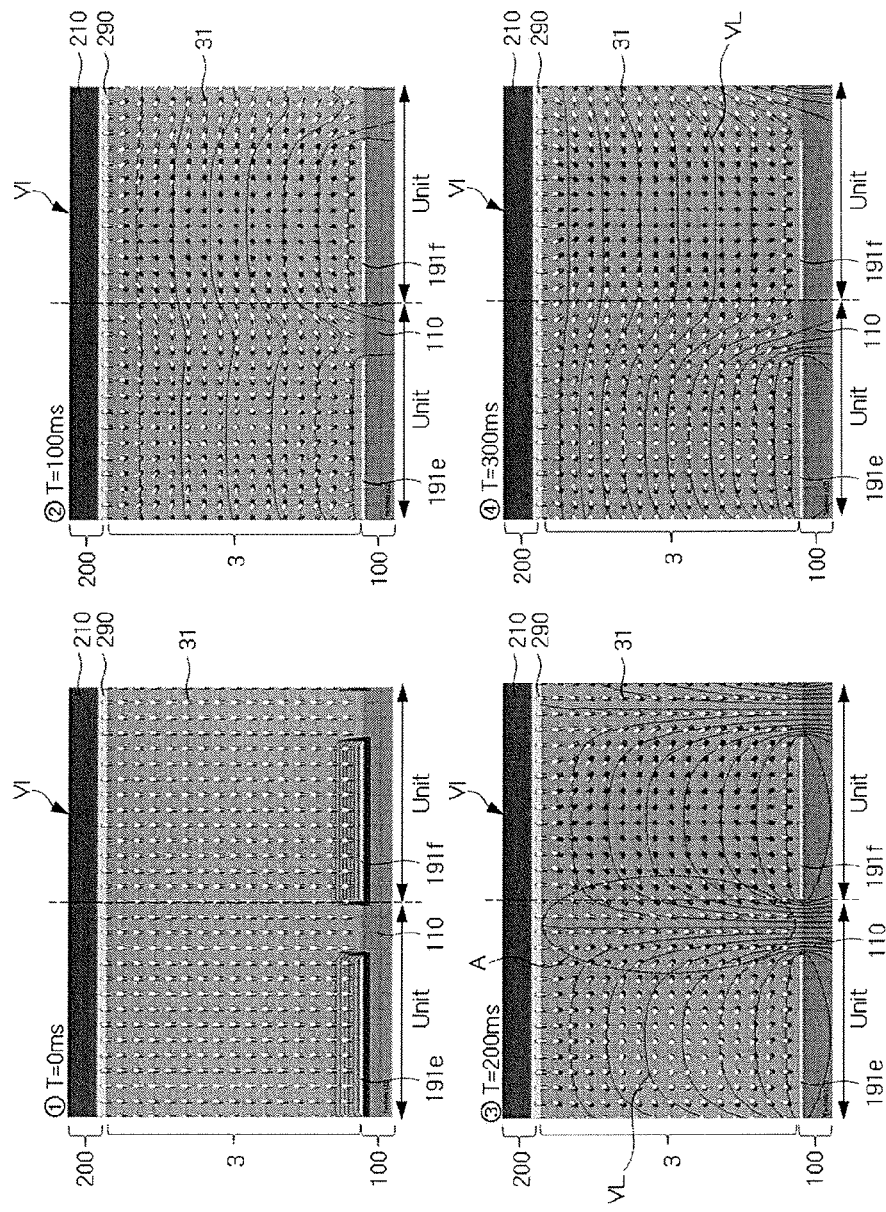
FIG. 19 shows of cross-sectional views taken along line VI of FIG. 8, which illustrate alignment of liquid crystal molecules before a voltage difference between first plate and second plates of an optical modulation device according to an exemplary embodiment of the present disclosure occurs, and after driving signals of steps 1 to 3 are respectively applied thereto.

Referring to an upper left view of FIG. 19, when no voltages are applied to the fifth and sixth electrodes 191e and 191f and the upper electrode 290, the liquid crystal molecules 31 are initially aligned in a direction substantially perpendicular to planes of the first and second plates 100 and 200, and may have pre-tilts due to the alignment directions of the first and second plates 100 and 200, as described above.

Referring to FIG. 11, after a predetermined amount of time, such as 100 ms, elapses after the optical modulation device 1 has received the first step (step 1) driving signal, the lower electrodes 191e and 191f and the upper electrode 290 receive the second step (step 2) driving signal. In the second step (step 2), voltages with polarities opposite with respect to the voltage applied to the upper electrode 290 are applied to the adjacent fifth and sixth electrodes 191e and 191f. For example, based on the voltage of the upper electrode 290, a voltage of −6 V may be applied to the sixth electrode 191f and a voltage of 6 V may be applied to the fifth electrode 191e, or vice versa.

A lower left diagram of FIG. 19 shows equipotential lines VL, and the liquid crystal molecules 31 in an area corresponding to the space G between the fifth and sixth electrodes 191e and 191f align in a direction substantially perpendicular to the plates 100 and 200, and the in-plane spiral alignment is broken.

A duration of the second step (step 2) may be, for example, about 100 ms, but embodiments are not limited thereto.

In addition, if the unit area includes a plurality of lower electrodes 191, the same voltage may be applied to all of the plurality of lower electrodes 191 of one unit area, and voltages may be applied that sequentially changed for a unit of at least one lower electrode 191. The voltages applied to the lower electrodes 191 of adjacent unit areas may have opposite polarities with respect to the voltage of the upper electrode 290. Further, the polarity of the voltage applied to the lower electrode 191 may reverse with a cycle of at least one frame.

Next, after a predetermined time, such as 100 ms, elapses after the optical modulation device 1 has received the second step (step (2) driving signal, the lower electrodes 191e and 191f and the upper electrode 290 receive the third step (step 3) driving signal, and, according to an embodiment, the received driving signals are maintained for the remaining duration of the corresponding frame.

In the third step (step 3), voltage levels applied to the lower electrodes 191e and 191f and the upper electrode 290 are similar to those applied in the first step (step 1), but the relative magnitudes of the voltages applied to the fifth and sixth electrodes 191e and 191f are reversed. That is, in the first step (step 1), if the voltage applied to the sixth electrode 191f is less than the voltage applied to the fifth electrode 191e, in the third step (step 3), the voltage applied to the sixth electrode 191f is greater than the voltage applied to the fifth electrode 191e. For example, in the third step (step 3), voltages of 6V, 4 V, and 0 V may be applied to the sixth electrode 191f, the fifth electrode 191f, and the upper electrode 290, respectively.

Next, as in the lower right view of FIG. 19, the liquid crystal molecules 31 realign according to the electric field generated in the liquid crystal layer 3. More specifically, most of the liquid crystal molecules 31 tilt substantially parallel to the surfaces of the first or second plates 100 and 200 to form an in-plane alignment, and long axes thereof rotate in-plane to form a spiral alignment as shown in FIGS. 20 and 21, and more particularly, to form an n-shaped alignment. In the liquid crystal molecules 31, azimuthal angles of the long axes change from about 180° to about 0°. A region where the azimuthal angles of the long axes of the liquid crystal molecules 31 change from about 180° to about 0° may have an n-shaped alignment.

It can take a certain amount of time until the alignment of the liquid crystal molecules 31 stabilizes after the optical modulation device 1 receives the third step (step 3) driving signal. The optical modulation device 1 having a backward phase slope receives the fourth step (step 4) driving signal to further stabilize the alignment of the liquid crystal molecules 31.

As described above, when the optical modulation device 1 is implemented as a half-wavelength plate that substantially satisfies Equation 1, a rotation direction of the incident circularly-polarized light is reversed. FIG. 20 illustrates a phase change as a function of position in the x-axis direction when right circularly-polarized light is incident to the optical modulation device 1. The right circularly-polarized light passing through the optical modulation device 1 changes to left circularly-polarized light, and since the phase retardation value of the liquid crystal layer 3 varies in the x-axis direction, the phase of the emitted circularly-polarized light continuously changes.

In general, when an optical axis of a half-wavelength plate rotates in-plane by $\phi$, the phase of the emitted light changes by $2\phi$, and as a result, the phase of the light emitted from a unit area in which the azimuthal angle of the long axes of the liquid crystal molecules 31 has changed to 180° changes from $2\pi$ to 0 radian in the x-axis direction, as shown in FIG. 18. This may be referred to as a backward phase slope. The phase change may repeat for each unit area, and a backward phase slope portion of a lens that changes light direction can be implemented using the optical modulation device 1.

Since principles of a method of implementing a backward phase slope are substantially the same as those of a method of implementing a forward phase slope, a repeated detailed description thereof is omitted.

As such, according to an exemplary embodiment of the present disclosure, an in-plane rotation angle of the liquid crystal molecules 31 may be controlled by a method of applying the driving signal to modulate optical phases and form various light diffraction angles.

Next, a method of implementing a center portion where a forward phase slope connects a backward phase slope within one lens, and a boundary of two adjacent lenses will be described with reference to FIGS. 9 to 11 and 22 to 27.

In an embodiment shown in FIG. 8, two lenses each include first to sixth electrodes 191a through 191f. Hereinafter, an embodiment of the optical modulation device 1 in which the forward phase slope is formed in the liquid crystal layer 3 corresponding to the first and second electrodes 191a and 191b, the center portion of the lens is formed in the liquid crystal layer 3 corresponding to the third and fourth electrodes 191c and 191d, and the backward phase slope is formed in the liquid crystal layer 3 corresponding to the fifth and sixth electrodes 191e and 191f, will be described. A direction of a phase slope formed in the liquid crystal layer 3 corresponding to each electrode may vary according to the strength and timing of the signal applied to each electrode.

In a present exemplary embodiment, electrodes that are disposed at the boundary of two adjacent lenses and the center portion of the lens will be described.

FIGS. 22 to 26 are cross-sectional views taken along lines VIII and IX of FIG. 8, which illustrate alignment of liquid crystal molecules before a voltage difference is applied between a first plate and a second plate of an optical modulation device according to an exemplary embodiment of the present disclosure, and alignment of the liquid crystal molecules after the liquid crystal molecules have stabilized after application of first step to fourth step (step 1~step 4) driving signals.

Figure 22:
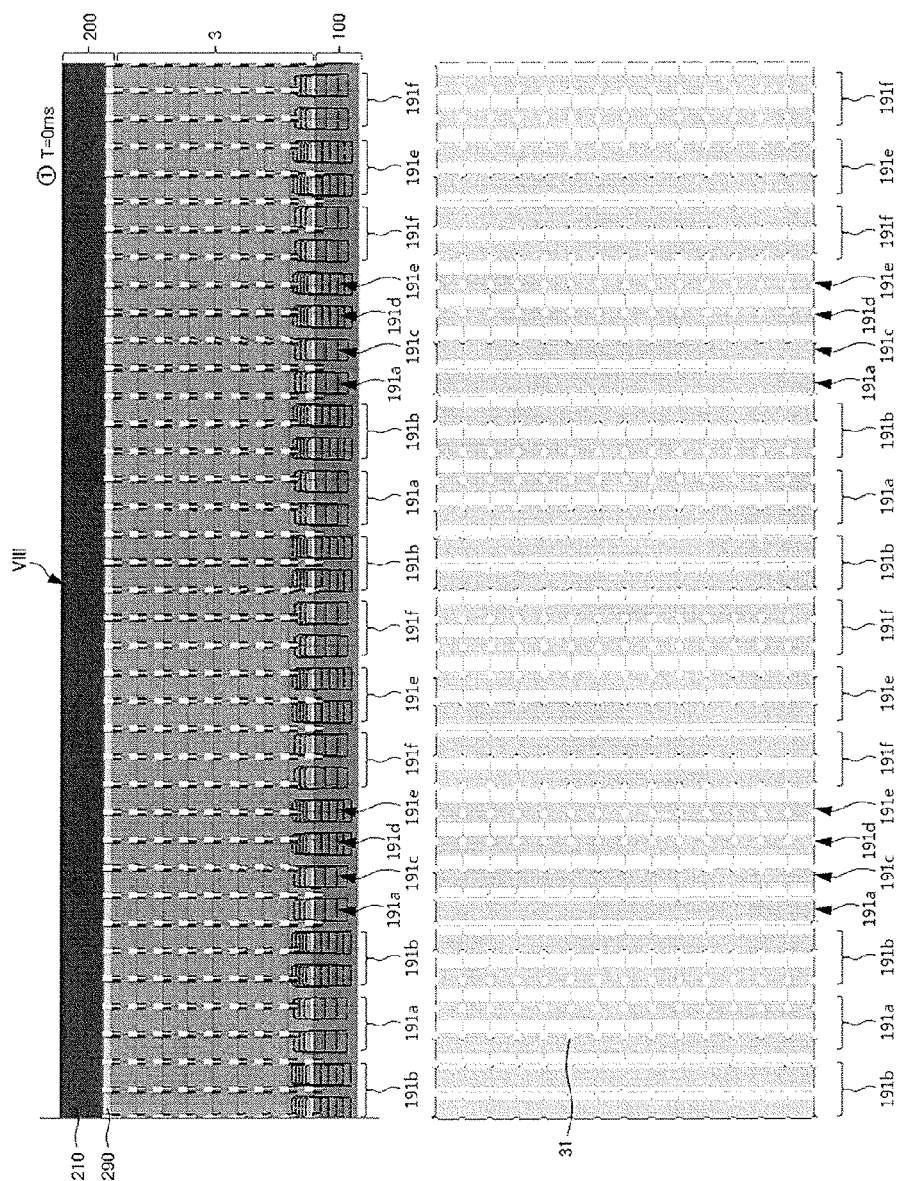
FIGS. 22 to 26 shows cross-sectional views taken along lines VIII and IX of FIG. 8, which illustrate alignment of liquid crystal molecules before a voltage difference is applied between a first plate and second plate of an optical modulation device according to an exemplary embodiment of the present disclosure, and alignment of the liquid crystal molecules when the liquid crystal molecules have stabilized after driving signals of steps 1 to 4 have been applied thereto.

First, referring to FIG. 22, when no voltage difference is generated among the lower electrodes 191a, 191b, 191c, . . . , 191f of the first plate 100 and the upper electrode 290 of the second plate 200, and thus no electric field is generated in the liquid crystal layer 3, the liquid crystal molecules 31 aligned with an initial pre-tilt.

Figure 23:
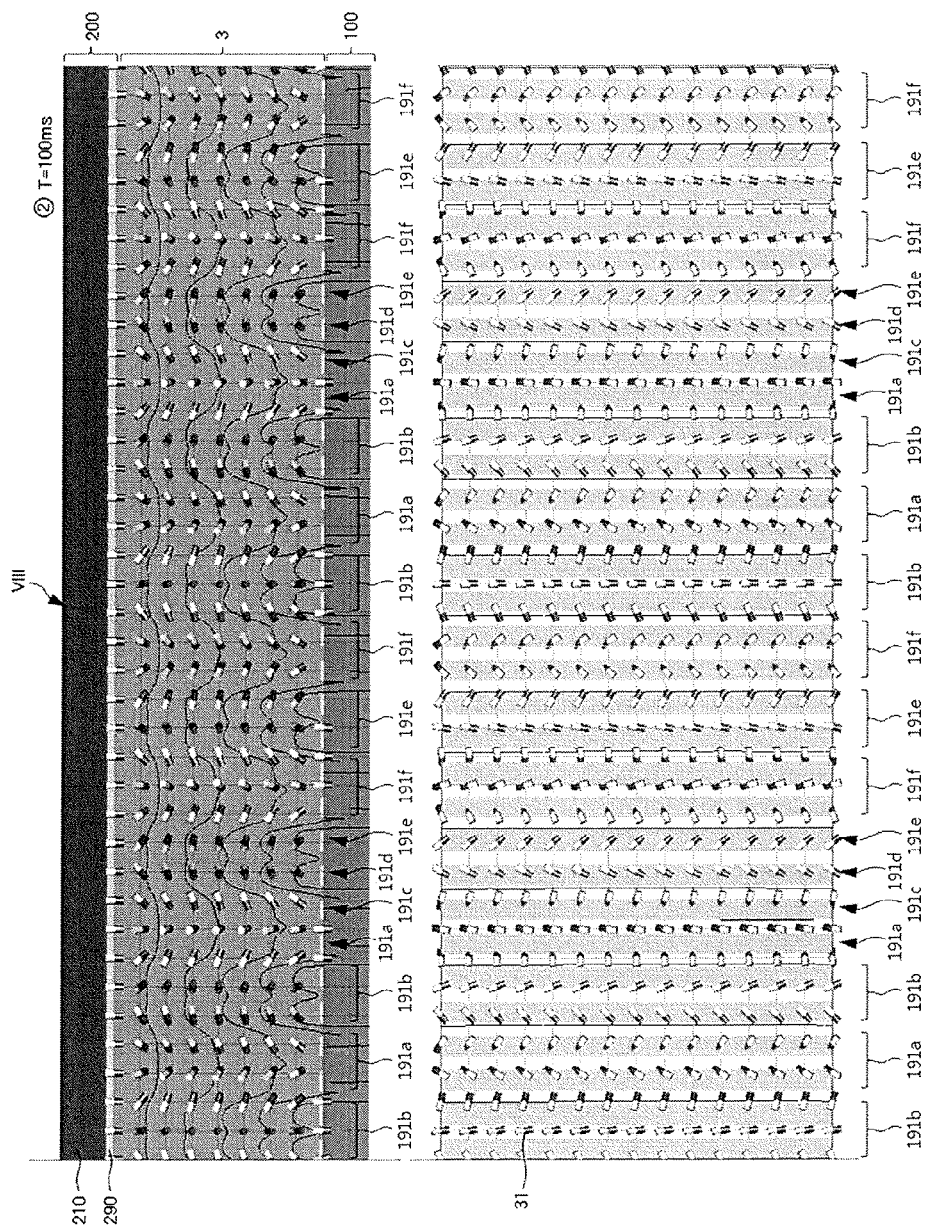

Next, as shown in FIG. 23, in the first step (step 1), a voltage applied to the second electrode 191b is greater than that applied to the first electrode 191a, a voltage applied to the fourth electrode 191f is greater than that applied to the third electrode 191c, and a voltage applied to the fifth electrode 191e is greater than that applied to the sixth electrode 191f, and the liquid crystal molecules 31 realign according to the electric fields generated in the liquid crystal layer 3.

More specifically, a first voltage V1 and a second voltage V2 is respectively applied to each of the two electrodes in the x-axis direction. In this case, the first voltage V1 is greater than the second voltage V2. For example, as shown in FIG. 8, the first voltage V1 is applied to two second electrodes 191b adjacent in the x-axis direction at the left boundary of the lens, and the second voltage V2 is applied to two first electrodes 191a adjacent in the x-axis direction with the two second electrodes 191b. In addition, the first voltage V1 is applied to the two second electrodes 191b neighboring the two first electrodes 191a in the x-axis direction, and the second voltage V2 is applied to the first electrode 191a adjacent to the center portion of the lens and the third electrode 191c disposed at the center portion of the lens. In addition, the first voltage V1 is applied to the fourth electrode 191d neighboring the third electrode 191c in the x-axis direction and the fifth electrode 191e adjacent to the center portion of the lens. As such, the first voltage V1 and the second voltage V2 are alternately applied along the x-axis direction to each of two neighboring electrodes from the left boundary to the right boundary of the lens.

The electric field generated in the liquid crystal layer 3 depends on the voltage applied to each of the electrodes in the first step (step 1), and the liquid crystal molecules at positions corresponding to each of the electrodes are aligned by the generated electric field. More specifically, most of the liquid crystal molecules 31 may tilt substantially parallel to the surfaces of the first or second plates 100 and 200 to form an in-plane alignment, and long axes thereof may rotate in-plane to be aligned.

Figure 10:
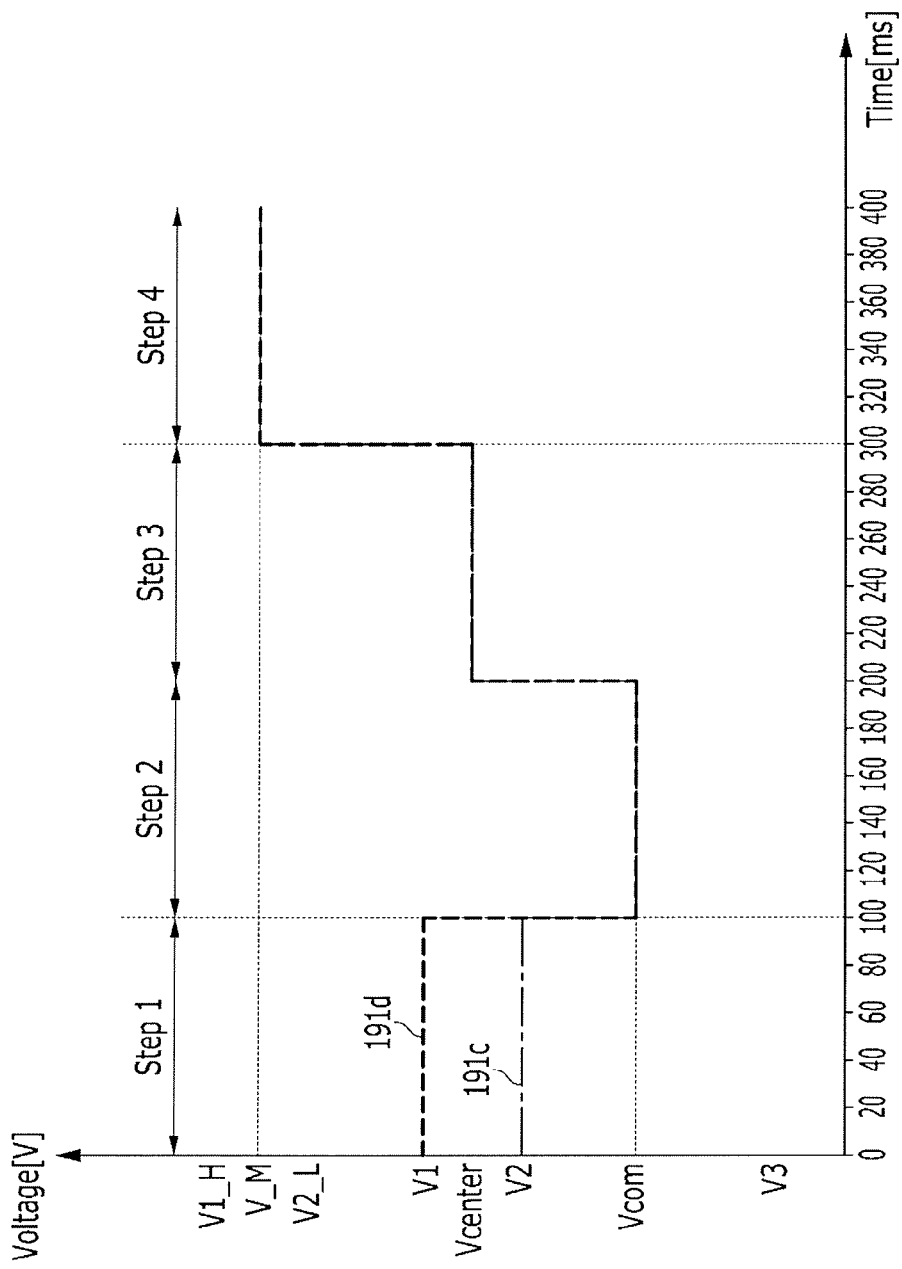

Next, as shown FIGS. 9, 10 and 11, voltages applied to the first electrode to the fourth electrode 191a, 191b, 191c, and 191d in the second step (step 2) are the same as those applied to the upper electrode 290, and voltages to form the backward phase slope are applied to the fifth and the sixth electrodes 191e and 191f. For example, a voltage with a polarity opposite to that of the upper electrode 290 is applied to the sixth electrode 191f.

Figure 24:
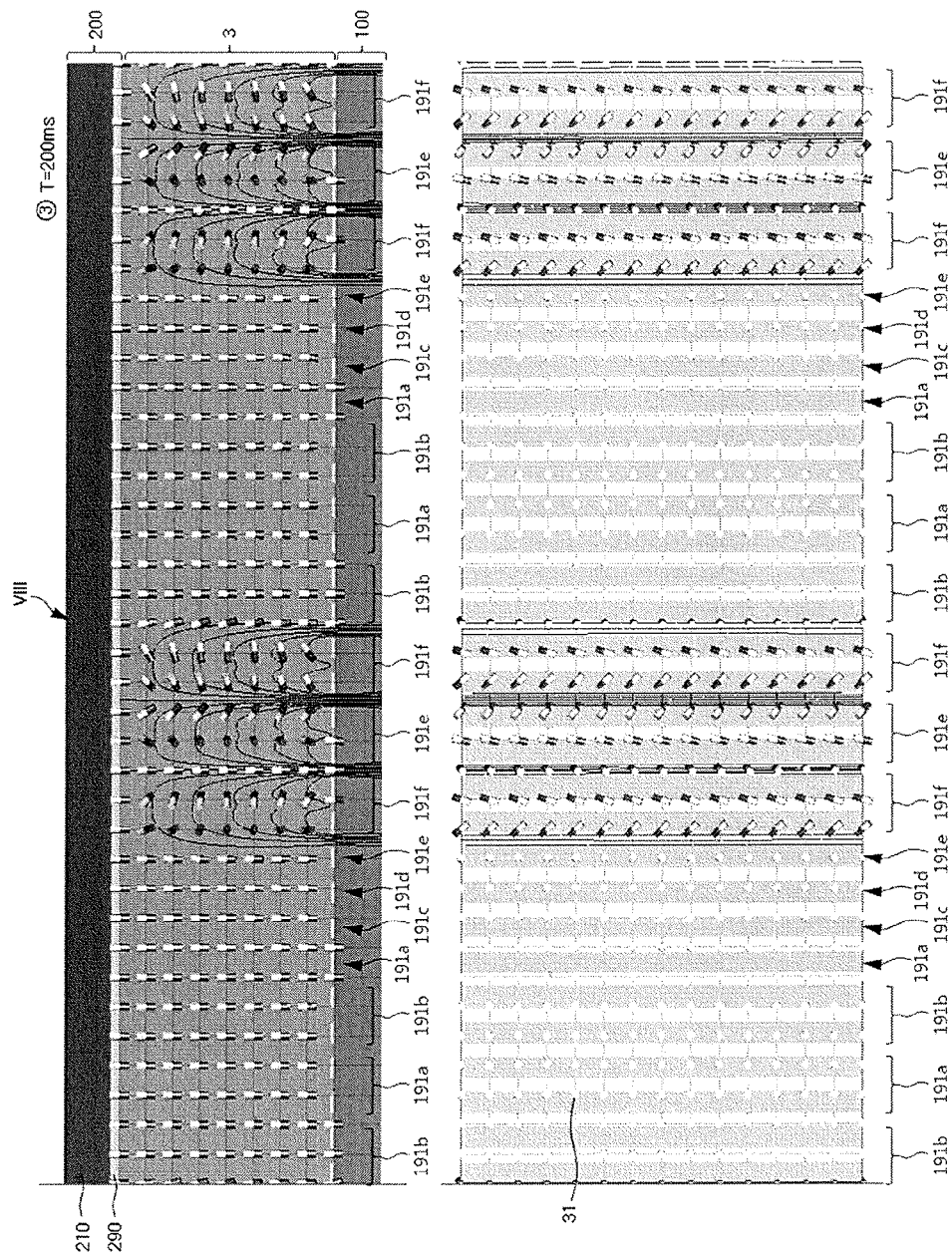
Figure 25:
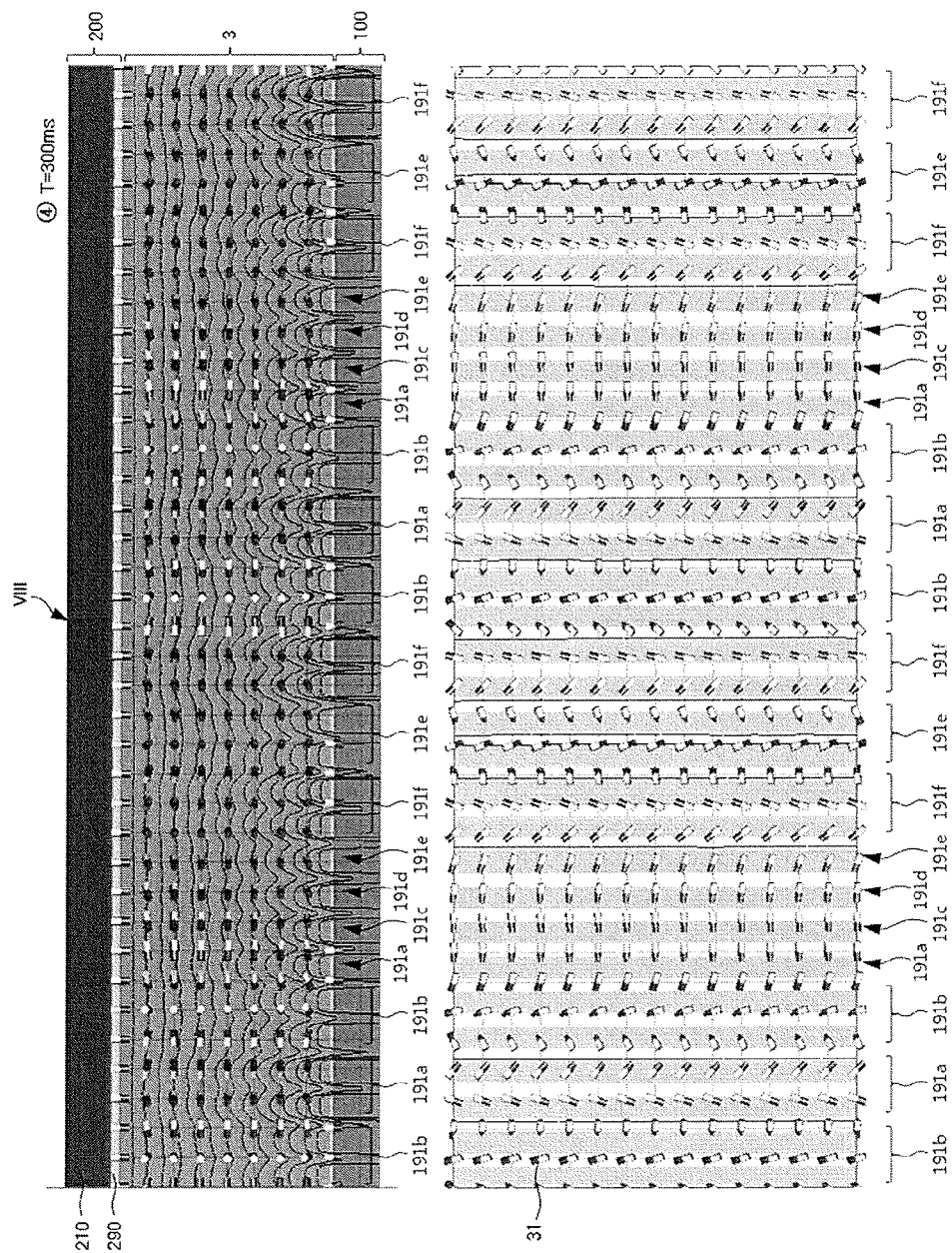
Figure 26:
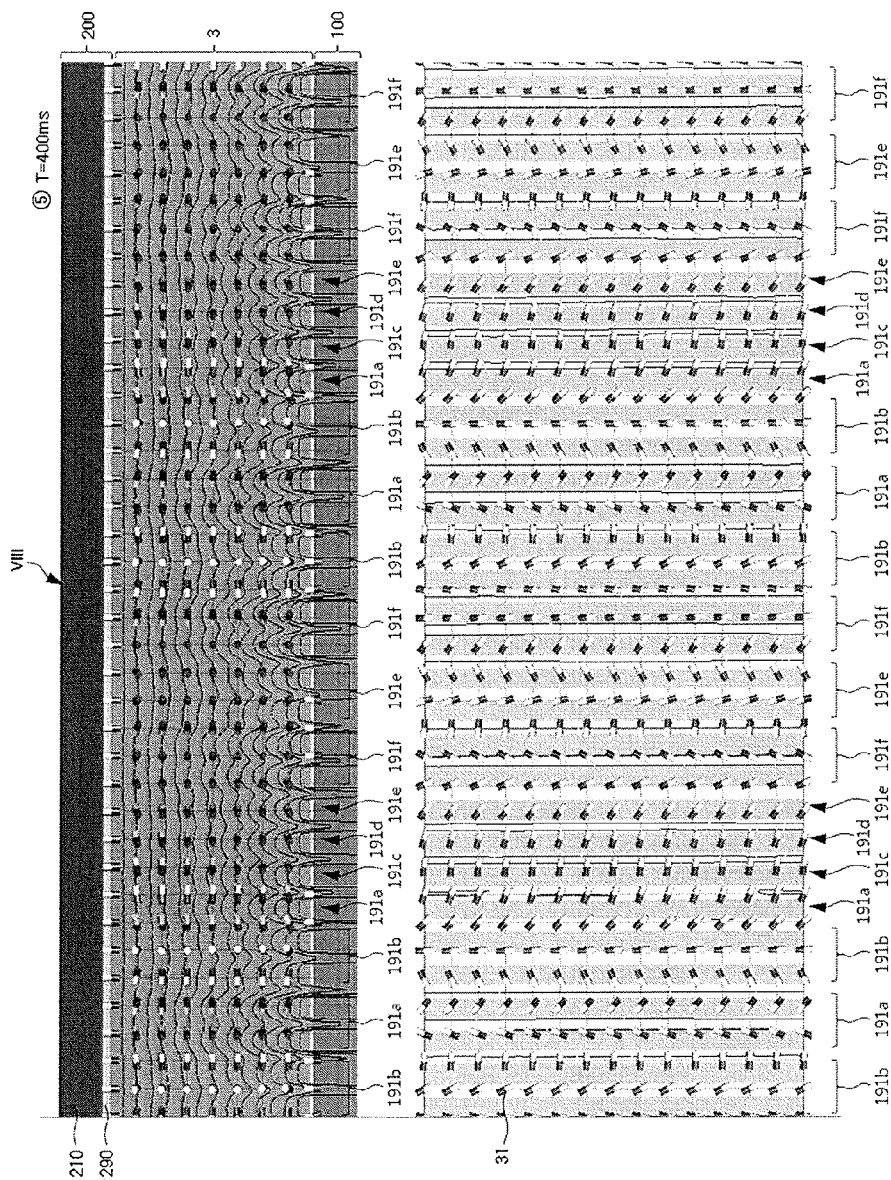

Then, as shown in FIG. 24, the liquid crystal molecules 31 corresponding to the space between the fifth and sixth electrodes 191e and 191f disposed to the right of the center portion of the lens are aligned in a direction substantially perpendicular to the plates 100 and 200, and the in-plane spiral alignment is broken. In this case, the liquid crystal molecules 31 corresponding to the fifth and sixth electrodes 191e and 191f tilt substantially parallel to the first or second plates 100 and 200.

Further, the liquid crystal molecules 31 corresponding to the first to fourth electrodes 191a, 191b, 191c, and 191d are aligned in a direction perpendicular to the first and second plates 100 and 200. In this case, liquid crystal molecules 31 corresponding to a space between the rightmost sixth electrode 191f of the left lens and the leftmost second electrode 191b of the right lens, are aligned in a direction perpendicular to the first and second plates 100 and 200.

Next, as shown in FIGS. 9, 10, 11, and 25, a voltage greater than that applied to the second electrode 191b is applied to the first electrode 191a in the third step (step 3). Then, most of the liquid crystal molecules 31 corresponding to electrodes disposed at the left side of the third electrode 191c tilt substantially parallel to the surfaces of the first and second plates 100 and 200 to form an in-plane alignment, and long axes thereof rotate in-plane to form a spiral alignment, more particularly, to form a u-shaped alignment.

In addition, a voltage greater than that applied to the fifth electrode 191e is applied to the sixth electrode 191f in the third step (step 3). Then, the liquid crystal molecule 31 corresponding to electrodes disposed at the right side of the fourth electrode 191d realign according to the electric field generated in the liquid crystal layer 3. More specifically, most of the liquid crystal molecules 31 in the right area of the fourth electrode 191d tilt substantially parallel to the surfaces of the first or second plates 100 and 200 to form an in-plane alignment, and long axes thereof rotate in-plane to form a spiral alignment, more particularly, to form an n-shaped alignment.

In addition, an intermediate voltage (Vcenter) that is less than a voltage V1 applied to the first electrode 191a adjacent to the third and fourth electrodes 191c and 191d and greater than a voltage V2 applied to the fifth electrode 191e adjacent thereto is applied to the third electrode 191c and the fourth electrode 191d in the third step (step 3). Then, most of the liquid crystal molecules 31 in an area corresponding to the third and fourth electrodes 191c and 191d tilt substantially parallel to the surfaces of the first and second plates 100 and 200 to form an in-plane alignment, and long axes thereof rotate in-plane to align parallel to the x-axis.

Then, the forward phase slope, the center portion, and the backward phase slope in one lens are smoothly connected along the x-axis direction. For example, a phase slope increases along the x-axis direction from the left side to the center portion of the lens, which is referred to as the forward phase slope. Then, the phase slope is maintained along the x-axis direction at the center portion of the lens, which is referred to as a flat phase slope. Then, the phase slope decreases along the x-axis direction from the center portion to the right side of the lens, which is referred to as a backward phase slope.

In addition, most of the liquid crystal molecules 31 corresponding to the rightmost sixth electrode 191f of the first left lens and the leftmost second electrode 191b of the second lens tilt substantially parallel to the surfaces of the first or second plates 100 and 200 to form an in-plane alignment, and long axes thereof rotate in-plane to align parallel to the y-axis.

Accordingly, the boundary between the backward phase slope of the first lens L1 and the forward phase slope of the second lens L2 is clearly differentiated. When the long axes of the liquid crystal molecules 31 are parallel to the y-axis, since phase retardation of light passing through the liquid crystal molecules 31 is about 0 radian, a boundary between the first lens L1 and the second lens L2 may be implemented.

Next, as shown in FIGS. 9, 10, 11 and 26, after a predetermined amount of time, such as 100 ms, has elapsed after receipt of the third step (step 3) driving signal by the optical modulation device 1, the lower electrodes 191c, 191d, and 191e and the upper electrode 290 receive a fourth step (step 4) driving signal of the fourth step (step 4) and maintain the current voltage during the residual interval of the corresponding frame.

In the fourth step (step 4), the voltage applied to each of the electrodes is greater by a predetermined magnitude compared to that applied to each of the electrodes in the third step (step 3).

For example, in the fourth step (step 4), a voltage (V1_H) greater than the first voltage V1 applied in the third step (step 3) is applied to the electrodes 191b and 191f. In the fourth step (step 4), a voltage (V2_L) greater than the second voltage V2 applied in third step (step 3) is applied to the electrodes 191a and 191e. In the fourth step (step 4), a voltage (V_M) greater than the intermediate voltage (Vcenter) applied in the third step (step 3) is applied to the electrodes 191c and 191d. In this case, the voltage (V_M) is about the middle of the voltages (V1_H) and (V2_L).

That is, in the fourth step (step 4), the relative magnitudes of the voltages between the respective electrodes 191a, 191b, 191c, . . . , 191f in the third step (step 3) is maintained, but the absolute magnitudes of each of the voltages increases, thereby increasing the intensity of the electric field generated in the liquid crystal layer 3. Since control of the liquid crystal molecules 31 is strengthened based on the increased intensity of the electric field, texture may be suppressed and diffraction efficiency may be enhanced.

Figure 27:
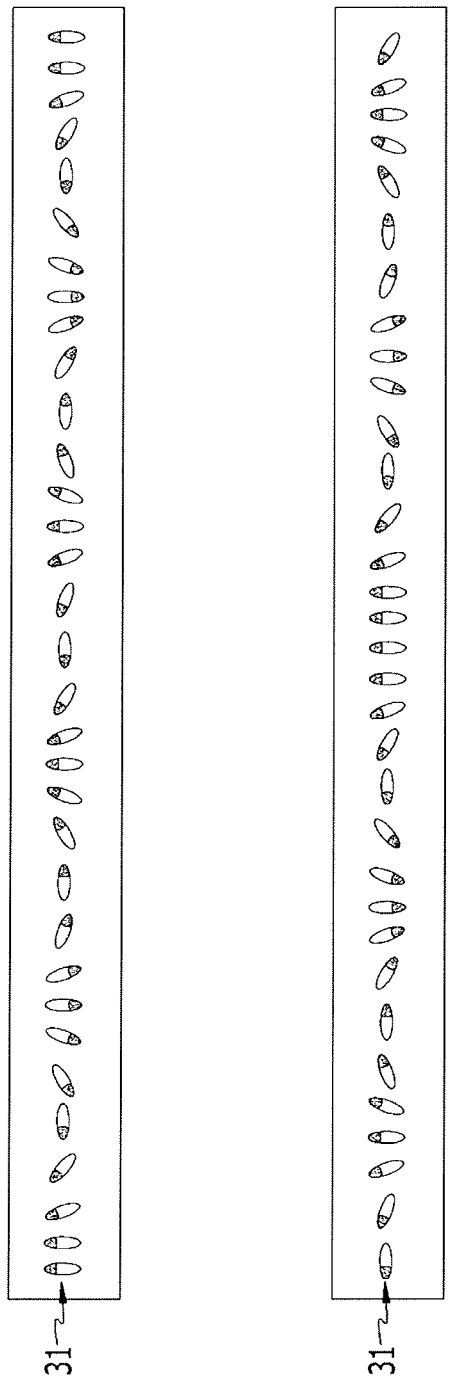
FIG. 27 illustrates alignment of liquid crystal molecules when the liquid crystal molecules have stabilized after a fourth step driving signal was applied to an optical modulation device according to an exemplary embodiment of the present disclosure.

FIG. 27 illustrates alignment of the liquid crystal molecules after the liquid crystal molecules have stabilized after receipt of the fourth step (step 4) driving signal by the optical modulation 1 device according to an exemplary embodiment of the present disclosure.

In one lens, the azimuthal angles of the long axes of the liquid crystal molecules 31 change from about 0° to about 180° along the x-axis from the leftmost side of the lens. A region where the azimuthal angles of the long axes of the liquid crystal molecules 31 change from about 0° to about 180° has a u-shaped alignment. As shown in FIG. 27, two u-shaped alignments have formed at a left side (B) of one lens of the optical modulation device 1.

Further, along the x-axis, after forming the two u-shaped alignments, the long axes of the liquid crystal molecule 31 align parallel to the x-axis. A region where the long axes of the liquid crystal molecules 31 are parallel to the x-axis is the center portion of the lens that connects the forward slope and the backward slope.

Further, the azimuthal angles of the long axes of the liquid crystal molecule 31 change from about 180° to about 0° along the x-axis to the right of the center portion of the lens. A region where the azimuthal angles of the long axes of the liquid crystal molecules 31 change from about 180° to about 0° has an n-shaped alignment. As shown in the upper view of FIG. 27, two n-shaped alignments have formed at the right side of one lens of the optical modulation device 1.

Further, the long axes of the liquid crystal molecules 31a are aligned parallel to the y-axis in the boundary portion of two adjacent lenses. As shown in the lower view of FIG. 27, a region where the long axes of the liquid crystal molecules 31a are aligned parallel to the y-axis is a boundary differentiating between a backward phase portion of the first lens L1 and a forward phase portion of the second lens L2.

Examples of voltages applied to the respective electrodes described above with reference to FIGS. 9, 10 and 11 are shown in Table 1 below.

TABLE 1

|  | first electrode | second electrode | third electrode | fourth electrode | fifth electrode | sixth electrode |
| --- | --- | --- | --- | --- | --- | --- |
| first step | V2 | V1 | V2 | V1 | V1 | V2 |
| second step | Vcom | Vcom | Vcom | Vcom | V1 | V3 |
| third step | V1 | V2 | Vcenter | Vcenter | V2 | V1 |
| fourth step | V1_H | V2_L | V_M | V_M | V2_L | V1_H |

Figure 28:
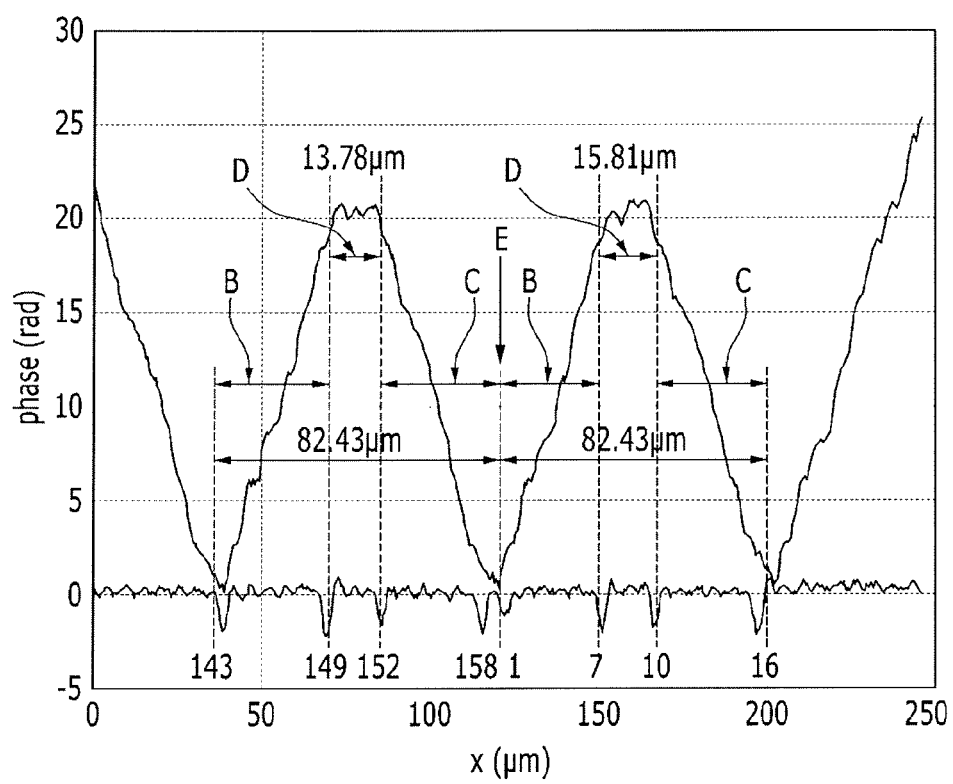
FIG. 28 is a simulation graph that illustrates a phase change as a function of position of light passing through an optical modulation device according to an exemplary embodiment of the present disclosure.

FIG. 28 is a simulation graph that illustrates a phase change as a function of position of light passing through an optical modulation device according to an exemplary embodiment of the present disclosure. Referring to FIG. 28, when the first to fourth step (steps 1, 2, 3, and 4) driving signals described above are applied to the optical modulation device 1, the forward phase slope may be implemented as shown in part B of FIG. 28, the backward phase slope may be implemented as shown in part C of FIG. 28, and the flat phase slope may be implemented as shown in part D of FIG. 28. Further, as shown part E of FIG. 28, the phase retardation of the boundary of two adjacent lenses may be 0 radian.

Figure 29:
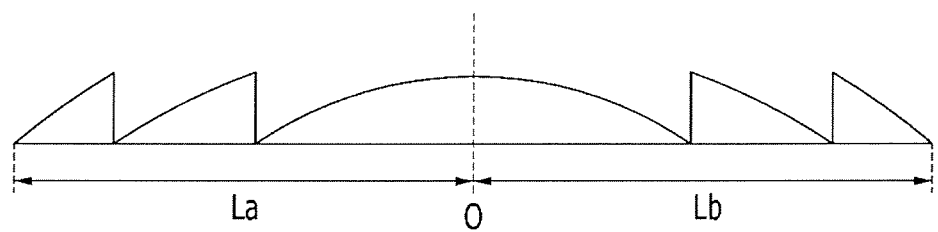
FIG. 29 illustrates a phase change as a function of position of a lens that can be implemented by an optical modulation device according to an exemplary embodiment of the present disclosure.

FIG. 29 illustrates a phase change as a function of position of a lens that can be implemented by an optical modulation device according to an exemplary embodiment of the present disclosure.

Since the optical modulation device 1 according to an exemplary embodiment of the present disclosure can implement a forward phase slope and a backward phase slope by varying the method of applying driving signals based on position as described above, a lens may be formed. FIG. 29 illustrates a phase change as a function of position of a Fresnel lens as an example of a lens that can be implemented by the optical modulation device 1. A Fresnel lens uses optical characteristics of a Fresnel zone plate, and since a phase distribution repeats periodically, effective phase retardation may be the same as or similar to that of a solid convex lens or a green lens.

As shown in FIG. 29, based on the center O of a Fresnel lens, a left portion La includes a plurality of forward phase slope areas of which x-axis direction widths may differ from each other and a right portion Lb includes a plurality of backward phase slope areas of which x-axis direction widths may differ from each other. Therefore, a first step (step 1) driving signal described above is applied to a portion of the optical modulation device 1 corresponding to the left portion La of the Fresnel lens to form the forward phase slope, and first step (step 1), second step (step 2), and third step (step 3) driving signals described above are sequentially applied to a portion of the optical modulation device 1 corresponding to the right portion Lb of the Fresnel lens to form the backward phase slope. Further, first step (step 1) to fourth step (step 4) driving signals described above are sequentially applied to a portion of the optical modulation device 1 corresponding to the center of the Fresnel lens to form the flat phase slope.

The plurality of forward phase slopes included in the left portion Lb of the Fresnel lens may have different widths according to position, and to this end, the width of the lower electrode 191 of the optical modulation device 1 corresponding to each forward phase slope and/or the number of lower electrodes 191 included in one unit area can be properly adjusted. Similarly, the plurality of backward phase slopes included in the right portion Lb of the Fresnel lens may have different widths according to position, and to this end, the width of the lower electrode 191 of the optical modulation device 1 corresponding to each backward phase slope and/or the number of lower electrodes 191 included in one unit can be properly adjusted.

When the voltages applied to the lower electrode 191 and the upper electrode 290 are adjusted, a phase curvature of the Fresnel lens changes.

Figure 30:
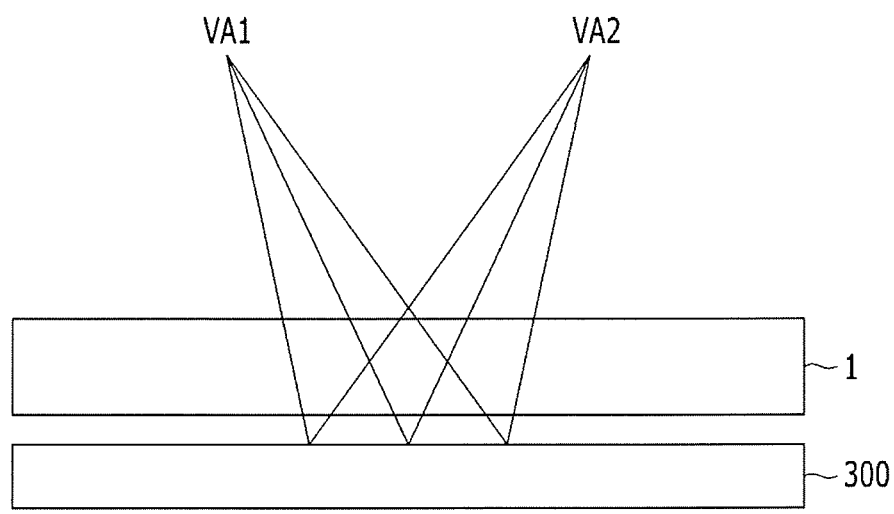
FIGS. 30 and 31 illustrate a schematic structure of a 3D image display device as one example of an optical device that uses an optical modulation device according to an exemplary embodiment of the present disclosure and a method of displaying 2D and 3D images, respectively.
Figure 31:
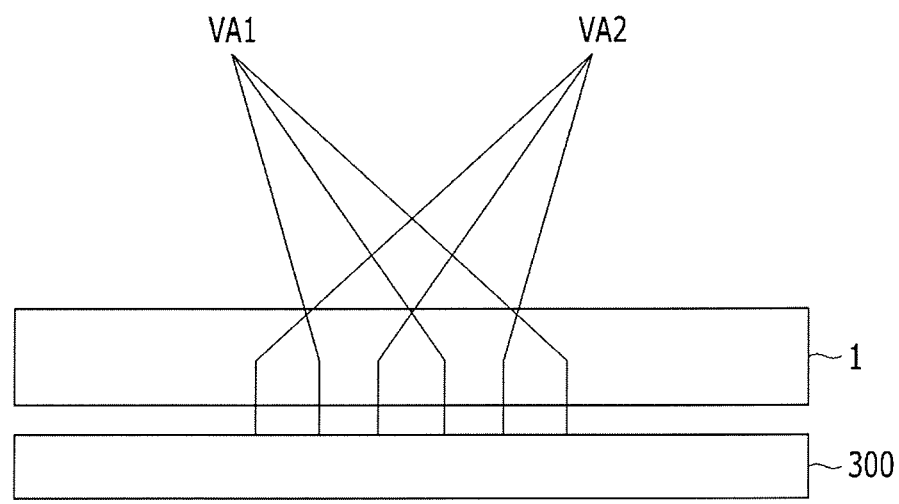

FIGS. 30 and 31 illustrate a schematic structure of a 3D image display device as one example of an optical device that uses an optical modulation device according to an exemplary embodiment of the present disclosure and a method of displaying 2D and 3D images, respectively.

An optical device according to an exemplary embodiment of the present disclosure that can function as a 3D image display device includes a display panel 300 and an optical modulation device 1 disposed in front of a front surface on which an image of the display panel 300 is displayed. The display panel 300 includes a plurality of pixels for displaying the image, and the plurality of pixels may be arranged in a matrix form.

The display panel 300 may display a 2D image of each frame in 2D mode as shown in FIG. 30, and divide and display images corresponding to various viewpoints such as a right-eye image and a left-eye image by a spatial division method in 3D mode as shown in FIG. 31. In 3D mode, some of the plurality of pixels display images corresponding to any one viewpoint, and the other pixels display images corresponding to other viewpoints. The number of viewpoints may be two or more.

The optical modulation device 1 can repetitively implement a Fresnel lens, including a plurality of forward phase slope portions and a plurality of backward phase slope portions, to divide images displayed on the display panel 300 for each viewpoint.

The optical modulation device 1 can be switched on/off. When the optical modulation device 1 is switched on, a 3D image display device operates in 3D mode, and as shown in FIG. 29, forms a plurality of Fresnel lenses that refract the image displayed on the display panel 300 to display the image at the corresponding viewpoint. On the other hand, when the optical modulation device 1 is switched off, as shown in FIG. 30, the image displayed on the display panel 300 is not refracted, but is transmitted to be perceived as a 2D image.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of driving an optical modulation device, wherein the optical modulation device comprising a first plate that includes a plurality of lower electrodes; a second plate facing the first plate and that includes a single upper electrode; and a liquid crystal layer disposed between the first plate and the second plate and that includes a plurality of liquid crystal molecules, the method comprising:
   applying a voltage to the upper electrode;
   forming a forward phase slope by applying a first driving signal to at least one lower electrode in a first area;
   forming a backward phase slope by applying a second driving signal different from the first driving signal to at least one lower electrode in a second area;
   forming an area without phase retardation by applying a third driving signal to at least two lower electrodes in a third area between the first area and the second area that is narrower than the first area and the second area; and forming a flat phase slope by applying a fourth driving signal different from the first to third driving signals to at least one lower electrode in a fourth area between the first area and the second area.

2. The driving method of claim 1, wherein
when the first driving signal is applied to at least one lower electrode in the first area,
an absolute value of a first voltage applied to the lower electrode in a first unit area in the first area is less than that of a second voltage applied to the lower electrode in a second unit area adjacent to the first unit area.

3. The driving method of claim 2, wherein
when the first driving signal is applied to the lower and upper electrodes in the first area,
polarities of the first voltage and the second voltage with respect to the voltage of the upper electrode are the same.

4. The driving method of claim 1, wherein
forming the backward phase slope in the second area includes
applying a fifth driving signal different from the first and second driving signals to at least one lower electrode in the second area and applying the second driving signal thereto when a first time interval elapses; and
applying the second driving signal to at least one lower electrode in the second area and applying the first driving signal thereto when a second time interval elapses.

5. The driving method of claim 4, wherein
when the second driving signal is applied to at least one lower electrode in the second area,
a polarity of a third voltage applied to the lower electrode in a third unit area in the second area is opposite to a polarity of a fourth voltage applied to the lower electrode in a fourth unit area adjacent to the third unit area.

6. The driving method of claim 4, wherein
when the first driving signal is applied to at least one lower electrode in the second area,
an absolute value of a fifth voltage applied to the lower electrode in the third unit area is greater than that of a sixth voltage applied to the lower electrode in the fourth unit area.

7. The driving method of claim 4, wherein
forming an area without phase retardation in the third area includes
applying the fifth driving signal to at least one lower electrode in the third area and applying the third driving signal thereto when the first time interval elapses; and
applying the third driving signal to at least one lower electrode in the third area and applying the first driving signal thereto when the second time interval elapses.

8. The driving method of claim 7, wherein
when the fifth driving signal is applied to at least one lower electrode in the third area,
an absolute value of a seventh voltage applied to the lower electrode in a fifth unit area in the third area is less than that of an eighth voltage applied to the lower electrode in a sixth unit area adjacent to the fifth unit area, and
polarities of the fourth voltage and the eighth voltage with respect to the voltage of the upper electrode are the same.

9. The driving method of claim 8, wherein
when the third driving signal is applied to at least one lower electrode in the third area, a polarity of a ninth voltage applied to the lower electrode included in the fifth unit area is opposite to a polarity of the seventh and eighth voltages, and
a voltage applied to the lower electrode in the sixth unit area is the same as that of the upper electrode.

10. The driving method of claim 4, wherein
forming the flat phase slope in the fourth area includes
applying the fifth driving signal to at least one lower electrode in the fourth area and applying a sixth driving signal different from the first to fifth driving signals thereto when the first time interval elapses; and
applying the sixth driving signal to at least one lower electrode in the third area and applying the fourth driving signal thereto when the second time interval elapses.

11. The driving method of claim 10, wherein
when the sixth driving signal is applied to at least one lower electrode in the fourth area,
a voltage applied to at least one lower electrode in the fourth area is the same as that of the upper electrode.

12. The driving method of claim 10, wherein
when the fourth driving signal is applied to at least one lower electrode in the fourth area,
an absolute value of a voltage applied to at least one lower electrode in the fourth area is less than that of the first voltage and greater than that of the second.

13. An optical modulation device, comprising:
a first plate that includes a plurality of lower electrodes;
a second plate facing the first plate and that includes a single upper electrode; and
a liquid crystal layer disposed between the first plate and the second plate and that includes a plurality of liquid crystal molecules,
wherein the optical modulation device is driven by a method that includes:
applying a voltage to the upper electrode;
forming a forward phase slope by applying a first driving signal to at least one lower electrode in a first area;
forming a backward phase slope by applying a second driving signal different from the first driving signal to at least one lower electrode in a second area;
forming an area without phase retardation by applying a third driving signal to at least two lower electrodes in a third area between the first area and the second area that is narrower than the first area and the second area; and
forming a flat phase slope by applying a fourth driving signal different from the first to third driving signals to at least one lower electrode in a fourth area between the first area and the second area.

14. The optical modulation device of claim 13, wherein
an absolute value of a first voltage applied to the lower electrode in a first unit area in the first area is less than that of a second voltage applied to the lower electrode in a second unit area adjacent to the first unit area.

15. The optical modulation device of claim 14, wherein
a fifth driving signal different from the first and second driving signals is applied to at least one lower electrode in the second area, and the second driving signal is applied thereto when a first time interval elapses; and
the second driving signal is applied to at least one lower electrode in the second area, and the first driving signal is applied thereto When a second time interval elapses.

16. The optical modulation device of claim 15, wherein
the fifth driving signal is applied to at least one lower electrode in the third area, and the third driving signal is applied thereto when the first time interval elapses; and
the third driving signal is applied to at least one lower electrode in the third area, and the first driving signal is applied thereto when the second time interval elapses.

17. The optical modulation device of claim 16, wherein
the fifth driving signal is applied to at least one lower electrode in the fourth area, and a sixth driving signal different from the first to fifth driving signals is applied thereto when the first time interval elapses; and
the sixth driving signal is applied to at least one lower electrode in the third area, and the fourth driving signal is applied thereto when the second time interval elapses.

18. The optical modulation device of claim 13, wherein
the first plate includes a first aligner,
the second plate includes a second aligner, and
an alignment direction of the first aligner and an alignment direction of the second aligner are substantially parallel to each other.

19. A method of driving an optical modulation device, wherein the optical modulation device includes an upper electrode, a plurality of lower electrodes facing the upper electrode that are numbered sequentially from left to right and that include a first and second electrodes in a left region, third and fourth electrodes in a center region, and fifth and sixth electrodes in a right region, and a liquid crystal layer between the upper electrode and the plurality of lower electrodes, the method comprising:
applying a common voltage to the upper electrode;
applying, during a first time interval, a first voltage and a second voltage less than the first voltage and greater than the common voltage respectively to the second and first electrodes, to the fourth and third. electrodes, and to the fifth and sixth electrodes;
applying, during a second time interval, the common voltage to the first to fourth electrodes, and the first voltage and a third voltage less than the common voltage respectively to the fifth and sixth electrodes;
applying, during a third time interval, the first and second voltages respectively to the first and second electrodes and to the sixth and fifth electrodes, and a center voltage intermediate in value between the first and second voltages to the third and fourth electrodes; and
applying, during a fourth time interval, fourth voltage and a sixth voltage respectively to the first and second electrodes and to the sixth and fifth electrodes, and a fifth voltage to the third and fourth electrodes, wherein the sixth voltage is greater than the fifth voltage which is greater than the fourth voltage, and the fourth voltage, the fifth voltage, and the sixth voltage are each respectively greater than the first voltage, the center voltage, and the second voltage by a predetermined amount.

20. The method of claim 19, wherein
the first to sixth electrodes are periodically repeated,
a lens is formed by application of voltages in the liquid crystal layer between the upper electrode and the repeated first to sixth electrodes, and
the lens includes a forward phase slope in a region corresponding to the first and second electrodes, a flat phase slope in a region corresponding to the third and fourth electrodes, and a backward phase slope in a region corresponding to the fifth and sixth electrodes, and a boundary Without phase retardation between the sixth electrode of a left side lens and the first electrode of a right side lens.

* * * * *